United States Patent

Kirino et al.

[11] Patent Number: 5,873,955
[45] Date of Patent: Feb. 23, 1999

[54] SOFT MAGNETIC THIN FILM, AND MAGNETIC HEAD AND MAGNETIC RECORDING DEVICE USING THE SAME

[75] Inventors: Fumiyoshi Kirino, Tokyo; Shigekazu Otomo, Sayama; Nagatugu Koiso, Tama; Noriyuki Kumasaka, Oume; Takeshi Miura, Hitachinaka, all of Japan

[73] Assignee: Hitachi, Ltd., Tokyo, Japan

[21] Appl. No.: 595,080

[22] Filed: Feb. 1, 1996

Related U.S. Application Data

[63] Continuation-in-part of Ser. No. 509,584, Jul. 31, 1995.

[30] Foreign Application Priority Data

| Aug. 12, 1994 | [JP] | Japan | 6-190694 |
| Sep. 14, 1994 | [JP] | Japan | 6-220585 |
| Feb. 2, 1995 | [JP] | Japan | 7-015739 |

[51] Int. Cl.⁶ .................. H01F 10/00
[52] U.S. Cl. ............ 148/306; 148/307; 148/308; 148/309; 148/311; 420/28; 420/103; 420/127; 428/457; 428/692; 360/126
[58] Field of Search ............ 428/457, 692; 420/28, 103, 127; 148/300, 306, 307, 308, 309, 311; 360/126

[56] References Cited

U.S. PATENT DOCUMENTS

| 5,104,464 | 4/1992 | Hasegawa | 148/300 |
| 5,117,321 | 5/1992 | Nakanishi et al. | 360/120 |
| 5,154,983 | 10/1992 | Watanabe | 428/611 |
| 5,176,806 | 1/1993 | Hasegawa | 204/192.11 |
| 5,244,627 | 9/1993 | Katsuki | 420/127 |
| 5,474,624 | 12/1995 | Suzuki et al. | 148/121 |
| 5,478,416 | 12/1995 | Takaoka et al. | 148/306 |

FOREIGN PATENT DOCUMENTS

| 2-275605 | 11/1990 | Japan . |
| 3-20444 | 1/1991 | Japan . |

*Primary Examiner*—Stevan A. Resan
*Attorney, Agent, or Firm*—Fay, Sharpe, Beall, Fagan, Minnich & McKee

[57] ABSTRACT

A recording head for recording data onto a recording medium is provided with a thin film formed of the following compound $Fe_{100-a-b-c}X_aY_bZ_c$, wherein X is at least one element selected from the group consisting of Nb, Ta, Hf and Zr, Y is one or two elements selected from the group consisting of Cr, Ru, Al, Si, Ti and Rh, and Z is at least one element selected from the group consisting of C and N, and wherein $5 \leq a \leq 20$, $0.5 \leq b \leq 15$, $1 \leq c \leq 20$, and $0.5 \leq a/c \leq 0.7$, the carbide or the nitride of the element X having an average grain size of not larger than 3 nm. This way, increased corrosion resistance is provided without substantially reducing magnetic characteristics such as saturation and coercive force. A recording apparatus, such as a VTR, including such a recording head is disclosed as well as a recording medium formed using this thin film.

11 Claims, 8 Drawing Sheets

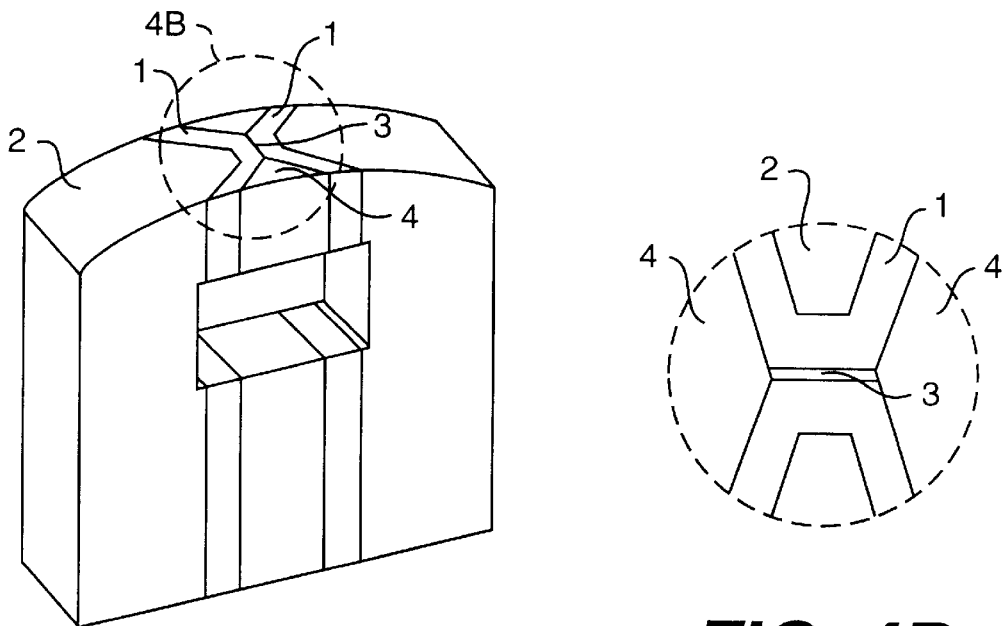
FIG. 4A
FIG. 4B
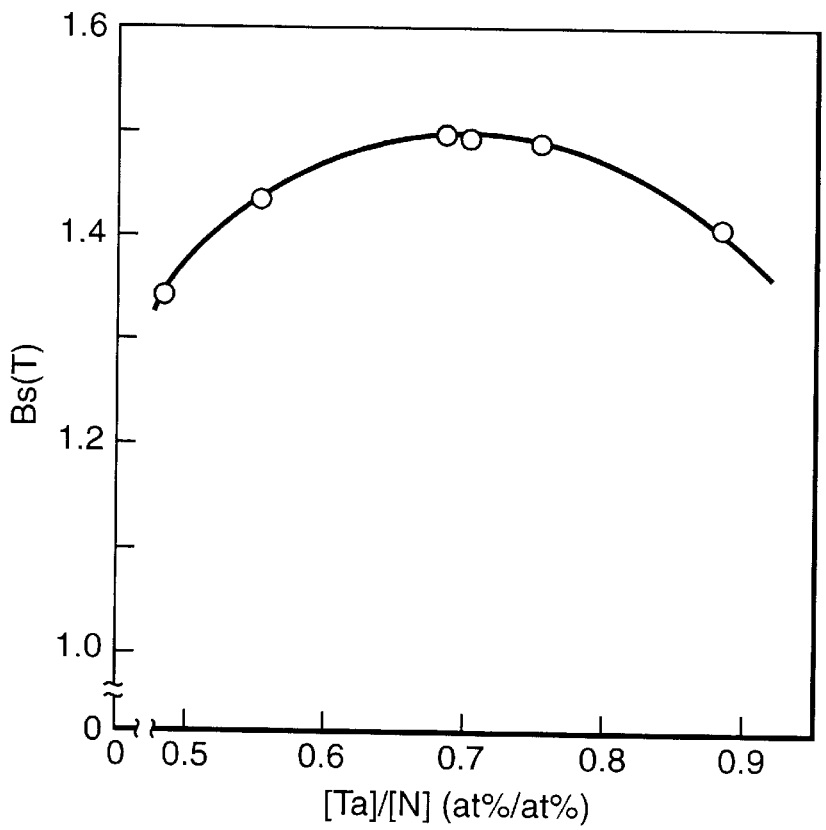
FIG. 5

SOFT MAGNETIC THIN FILM, AND MAGNETIC HEAD AND MAGNETIC RECORDING DEVICE USING THE SAME

This is a continuation-in-part of pending U.S. patent application Ser. No. 08/509,584, filed Jul. 31, 1995.

FIELD OF THE INVENTION

The present invention relates to a small crystal separating type soft magnetic film and, more particularly, to a soft magnetic thin film having high performance and high reliability, and a magnetic head and a magnetic recording unit manufactured with the soft magnetic thin film.

The present invention also relates to a magnetic film, which has a high saturation magnetization, a high permeability and a low magnetostriction constant and which has excellent corrosion resistance and hardness properties which is suitable for a head core material for a magnetic disc device or a VTR.

BACKGROUND OF THE INVENTION

In accordance with the developments of recent years, there is a need for small-sized and highly dense memories. For example, such memory needs are required for magnetic recording units, which are designed with high density magnetic recording and downsizing development objectives. For realizing the high density recording objective, it is necessary to provide a recording medium having a highly coercive force sufficient for the minute magnetic domains that are recorded to stably exist, and a high-performance magnetic head formed from a material capable of achieving such recording on the medium. In order to magnetize the highly coercive medium sufficiently for recording the signals, it is necessary to use a magnetic head material having a high saturation magnetization capable of establishing an intense magnetic field. This magnetic material has conventionally been a Co-series amorphous alloy, an FeAlSi series (Sendust) alloy or the like.

At present, the magnetic material proposed to have such a high saturation magnetization is exemplified by an Fe—C alloy or an Fe—N alloy. These magnetic materials are subjected to a heat treatment at a constant temperature in an inert gas flow of argon or nitrogen, while being exposed to a magnetic field of about 3 to 10 KOe, if necessary, so that the soft magnetic properties may be developed. In case the magnetic head is the metal-in-gap (MIG) type head, its manufacturing process includes a glass bonding step at a bonding temperature that determines the temperature of the heat treatment. Since the soft magnetic properties of the magnetic film depend upon the small sized crystal grains to separate out, the crystal grain size has to be controlled in order to form a magnetic film having excellent soft magnetic properties. Moreover, since these magnetic materials are composed mainly of Fe, they react with oxygen and moisture in the atmosphere to produce hydroxides or oxides that cause the magnetic properties to fluctuate, especially the coercive force and/or saturation magnetization properties. Accordingly, the performance of the magnetic head deteriorates.

When a magnetic head formed of the aforementioned magnetic material is used in practice, it is necessary to suppress fluctuations in its magnetic properties. As a result, magnetic alloys have been proposed that contain a relatively large concentration of C, as expressed by a composition formula of Fe(Ti, Zr, Hf, Nb, Ta, Mo, W)C, and as disclosed in Japanese Patent Laid-Open No. 20444/1991, or a relatively large concentration of Fe(Zr, Hf, Ti, Nb, Ta, V, Mo, W)N, as disclosed in Japanese Patent Laid-Open No. 275605/1991.

SUMMARY OF THE INVENTION

In order to achieve a balance between the saturation magnetization and the soft magnetic properties, and especially between the coercive force and the corrosion resistance of a magnetic film suitable for use in magnetic recording/reading, the following considerations have been taken into account, according to the present invention. If the corrosion resistance is retained, for example, the magnetic properties, especially the saturation magnetization and the coercive force deteriorate so that the performance (e.g., the saturation magnetization) inherent in the Fe—C or Fe—N material cannot be realized and the performance of the magnetic head decreases. For example, in the case of recording, errors or noises may be caused that prevent high density recording. If the magnetic properties are retained, on the other hand, sufficient corrosion resistance may not be retained and it may be difficult to prevent the reliability of the magnetic head from being degraded. Also, with the addition of various elements to the alloys, the saturation magnetization tends to decrease, or the magnetostriction constant tends to increase. As a result, satisfactory recording cannot be ensured, or the output waveforms at the time of reading will be deformed so that problems are caused in the recording/reading characteristics.

A first object of the present invention is to provide a soft magnetic thin film which is chiefly composed of Fe or Co which has high saturation magnetization, exhibits improved corrosion resistance, has high performance and high reliability while maintaining magnetic characteristics.

A second object of the present invention is to provide a magnetic head having high performance and high reliability which uses the soft magnetic thin film according to the first object of the present invention.

A third object of the present invention is to provide a magnetic recording apparatus employing the magnetic head according to the second object of the present invention.

In order to achieve the above-mentioned objects of the present invention, a soft magnetic thin film is provided and is represented by the equation $$Fe_{100-a-b-c}X_aY_bZ_c$$

wherein X is at least one element selected from the group consisting of Nb, Ta, Hf and Zr, Y is one or two elements selected from the group consisting of Cr, Ru, Al, Si, Ti and Rh, and Z is at least one element selected from the group consisting of C and N, and wherein $5 \leq a \leq 20$, $0.5 \leq b \leq 15$, $1 \leq c \leq 20$, and $0.5 \leq a/c \leq 0.7$.

A soft magnetic thin film according to the present invention is also represented by $$Co_{100-a-b-c}X_aY_bZ_c$$

wherein X is at least one element selected from the group consisting of Nb, Ta, Hf and Zr, Y is one or two elements selected from the group consisting of Cr, Ru, Al, Si, Ti and Rh, and Z is at least one element selected from the group consisting of C and N, and wherein $5 \leq a \leq 20$, $0.5 \leq b \leq 15$, $1 \leq c \leq 20$, and $0.5 \leq a/c \leq 0.7$.

A soft magnetic thin film according to the present invention may also be represented in one of the two forms listed above wherein, the carbide or the nitride of the element X has an average grain size of not larger than 3 nm.

In any soft thin magnetic film mentioned above, the element Y is preferably Al—Si, Al, Cr—Ru, Cr—Rh or Ti—Cr. It is further preferable that the ratio a/c is $0.53 \leq a/c \leq 0.70$.

The fine crystals can be precipitated by heating the thin film during formation or after formation. For example, the film may be heated to a temperature of 550° C. to 600° C. for 20 minutes to 1 hour.

The X content is preferably within a range of 5 to 20 atomic percent (at %). This is because if the X content was less than 5 at %, $\alpha$-Fe or $\alpha$-Co would grow rapidly so that the coercive force would exceed 1 Oe and impair head characteristics. If the X content exceeds 20 at %, the film becomes nonmagnetic and is unsuitable for use as a material for use as the magnetic head material. If the X content lies within a range of 5 to 15 at %, the coercive force becomes $\leq 1$ Oe and the permeability ($\mu$) takes on a value of $\mu \geq 1000$ thereby providing desirable results. In the magnetic film according to the present invention, Nb, Ta, Hf and Zr all exhibit similar effects in both magnetic characteristics and corrosion resistance.

The Y content is preferably within a range of 0.5 to 15 at %. If the Y content is less than 0.5 at %, corrosion resistance and heat resistance are not adequately obtained. Of course, the range between 0 and 0.5 at % for the Y content is difficult to test. On the other hand, if the Y content exceeds 15 at %, a solid solution of element Y and Fe causes the saturation magnetization to decrease and also causes the film to become nonmagnetic.

The Z content is preferably within a range of 1 to 20 at %. If the Z content is less than 1 at %, $\alpha$-Fe or $\alpha$-Co grows rapidly causing the coercive force to exceed 1 Oe. On the other hand, if the Z content exceeds 20 at %, the film becomes nonmagnetic and is unsuitable for use as the magnetic head material. When the Z content lies within a range of 5 to 15 at %, the coercive force desirably becomes $\leq 1$ Oe and the permeability $\mu$ becomes $\mu \geq 1000$. In the magnetic film according to the present invention C and N exhibit the same effects for both magnetic characteristic and corrosion resistance.

The soft magnetic thin film according to this first embodiment of the present invention can be used in at least one portion of a magnetic head core to construct a magnetic head. An especially preferable magnetic head is of the metal-in-gap (MIG) type. If this magnetic head is used, it is possible to construct a magnetic recording unit for recording information in/on a moving information recording medium by using the magnetic properties. The information to be recorded may be video information and/or audio information, and the moving information recording medium may be exemplified by a magnetic tape or a magnetic disc formed with a magnetic recording layer.

In order to enhance the corrosion resistance of the magnetic thin film of the type in which microcrystals are precipitated, controlling the grain size of the main element, Fe or Co, as well as the grain size of a carbide or a nitride is important. The grain size of Fe or Co can be controlled by a solid solution having one or two elements selected from a group consisting of Cr, Ru, Al, Si, Ti and Rh. The grain size of the carbide or nitride of Nb, Ta, Hs or Zr can be controlled by controlling the ratio of such an element to the concentration to C or N.

By controlling the ratio of the element X to the element Z, the average grain size of the carbide or nitride of the element X precipitated by the heat treatment during or after the formation of the magnetic film can be reduced to 3 nm or less, so that the magnetic film will have a sufficiently large corrosion resistance. At the same time, the main element, Fe or Co, exists in the form of $\alpha$-Fe or $\alpha$-Co, and the crystal plane (110) is preferentially oriented. As a result, when the head is fabricated, a small current is needed for erasing the recorded data at a predetermined erasing ratio; i.e., favorable erasing characteristics are obtained, and boundary regions of magnetic domains are formed in a clear shape during the recording.

BRIEF DESCRIPTION OF THE DRAWINGS

FIG. 4(a) is a schematic diagram showing a structure of a metal-in-gap (MIG) type of magnetic head formed using the magnetic film of the present invention.

FIG. 4(b) is an enlarged view of a portion of the structure of FIG. 4(a) more clearly illustrating the gap portion.

FIG. 5 illustrates the relationship between saturation magnetization and the ratio of Ta/N for a soft magnetic thin film according to the present invention.

DETAILED DESCRIPTION OF THE PREFERRED EMBODIMENTS

Figure 1A:
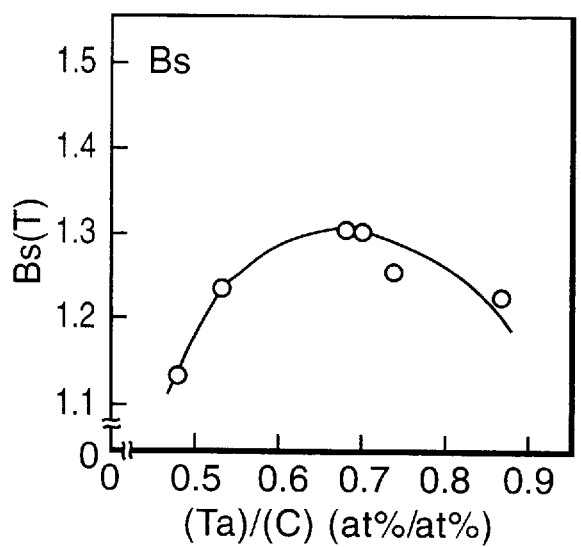
FIGS. 1(a)–(d) illustrate the relationship between magnetic characteristics of a soft magnetic thin film and the ratio of Ta/C.
Figure 1B:
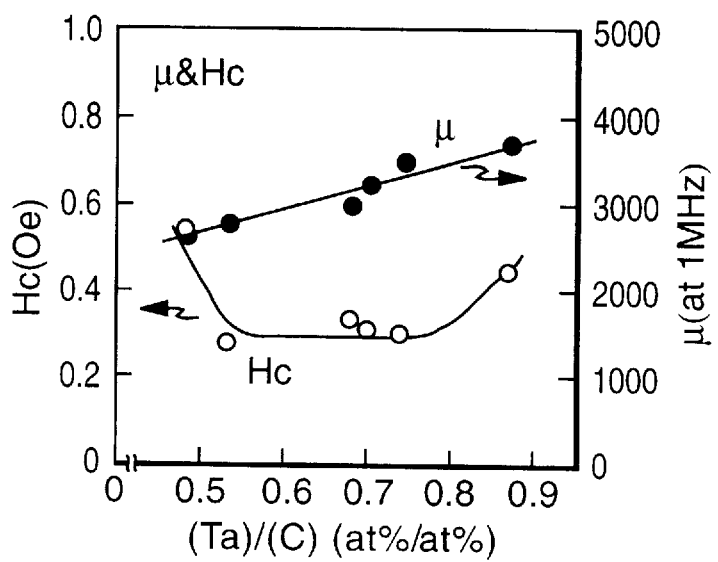
Figure 1C:
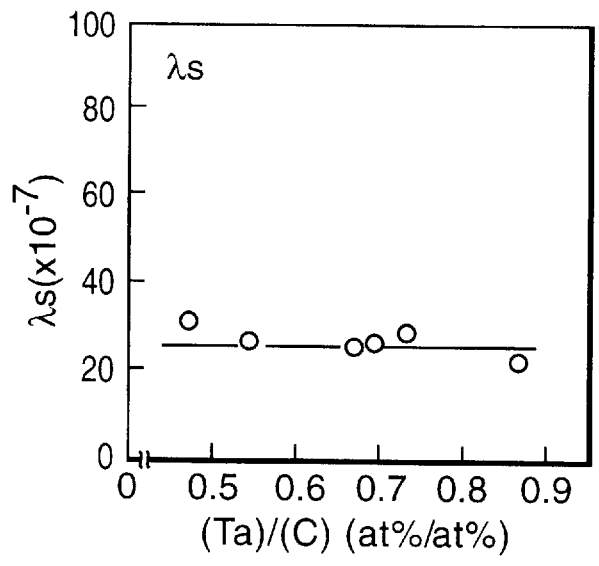
Figure 1D:
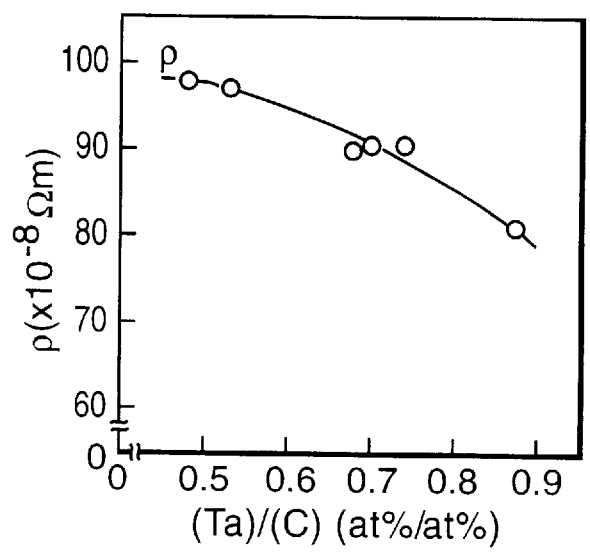
Figure 2A:
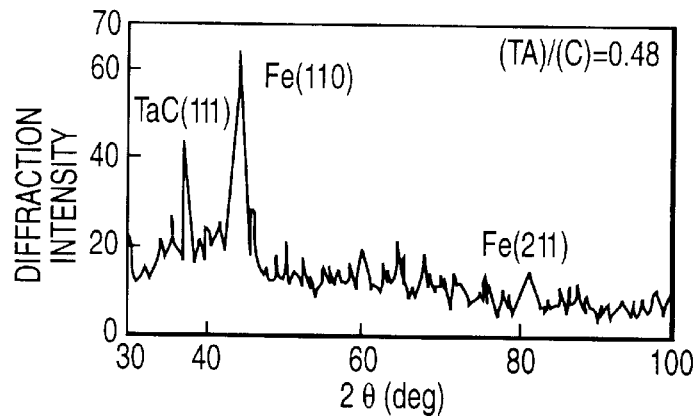
FIGS. 2(a)–(f) illustrate X-ray diffraction spectra of magnetic films of various compositions.
Figure 2B:
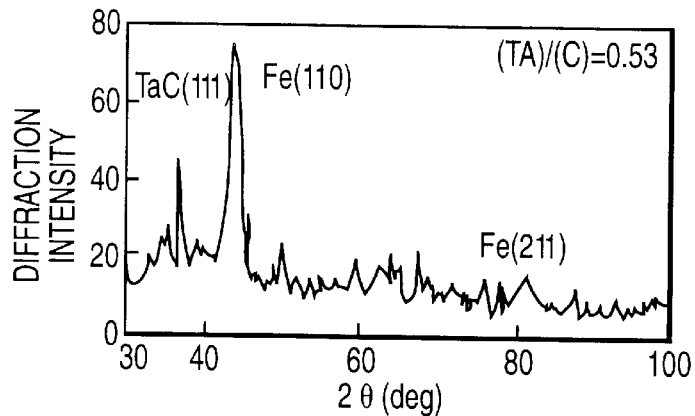
Figure 2C:
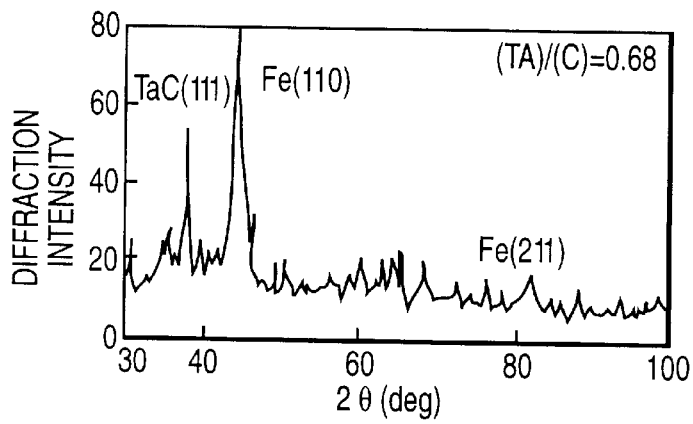
Figure 2D:
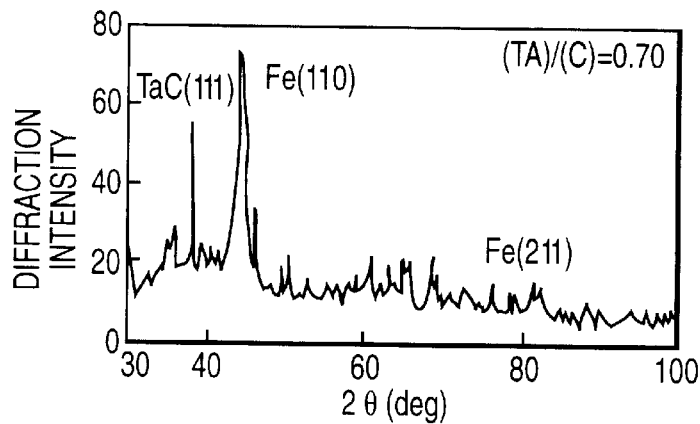
Figure 2E:
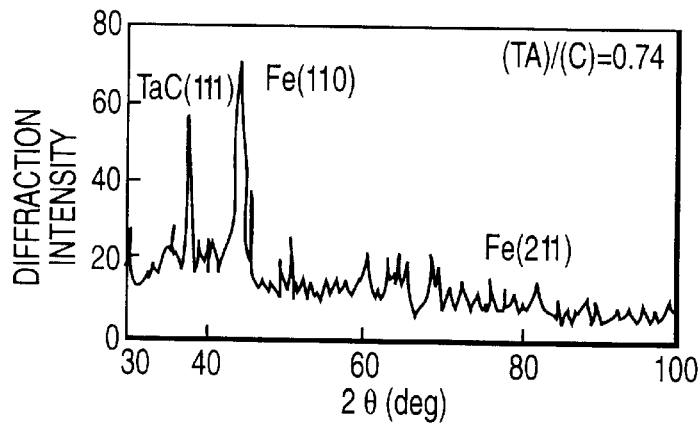
Figure 2F:
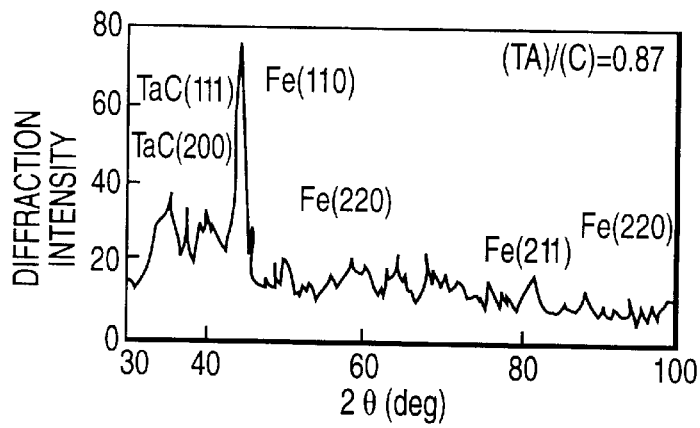

The invention will now be described in detail by way of Examples.

A magnetic recording medium was prepared by using an Fe—Ta—C—Cr—Ru alloy film as a magnetic thin film.

The magnetic film was formed by the sputtering method using Ar as a discharge gas. Powders of elements, i.e., Fe, Ta, C, Cr and Ru were molded by the hot isostatic press method (HIP method) and were used as target for sputtering. The composition of the target is $Fe_{85}(Ta_xC_y)_{15}]_{0.9}(Cr_8Ru_2)_{0.1}$ with different ratios x/y of 0.48, 0.53, 0.68, 0.70, 0.74 and 0.87 under the condition of x+y=1. By using the target formed by the HIP method, the thin film formed has substantially the same composition as the target. As the sample for measuring the magnetic characteristics, a magnetic film was formed on a crystallized glass substrate having its surface optically polished. The sputtering conditions vary depending upon the sputtering apparatus and the like. In this embodiment, however, the sputtering conditions are a discharge gas pressure of 5 mTorr and an RF power of 400 W/150 mmφ. The magnetic film was formed to a thickness of 5 $\mu$m. The film was heat-treated in an Ar atmosphere at 590° C. for 30 minutes. The atmosphere for heat treatment is not limited to Ar but may be any other atmosphere provided it is chemically inactive to the materials that are used.

First, magnetic characteristics of the magnetic film were examined when x/y was changed into 0.48, 0.53, 0.68, 0.70, 0.74 and 0.87. The results were as shown in FIGS. 1A–1D.

The saturation magnetization (Bs) increased with an increase in the value x/y and became a maximum at around x/y=0.68. As the value x/y further increased, Bs rather decreased. Thus, Bs varies depending upon the value x/y. To obtain a large Bs, it is desired that the value x/y is greater than 0.50. To keep the coercive force below 0.5 Oe (when the switching characteristics in a high-frequency region above 100 MHz when the film is used for the magnetic head), the value x/y must be set to be larger than 0.50. The magnetic permeability $\mu$ increases with an increase in the value x/y. Even the smallest magnetic permeability $\mu$ was 2500 (1 MHz) when x/y=0.48; i.e., there was no problem in regard to soft magnetic characteristics irrespective of the value x/y. The magnetostriction constant λs remained nearly constant ($2 \times 10^{-6}$) irrespective of the value x/y. The resistivity ρ gradually decreased with an increase in the value x/y, and changed from $98 \times 10^{-8}$ Ω.m.

The crystalline structure of the magnetic film was examined by the X-ray diffraction method. The results were as shown in FIGS. 2A–2F. In the magnetic films of x/y=0.48 to 0.74, the peaks were obtained on the (110) plane of Fe, on the (211) plane of Fe and on the (111) plane of TaC, and the (110) plane of Fe had been preferentially oriented. In the magnetic film of x/y=0.87 unlike the above-mentioned magnetic films, on the other hand, many planes were observed such as (110) plane of Fe, (211) plane of Fe, (220) plane of Fe, (111) plane of TaC, (200) plane of Tac and (220) plane of TaC. Besides, peaks increased and became sharp indicating the growth of crystalline particles in the magnetic film.

Grain sizes of the magnetic films were measured by using a transmission electron microscope, and it was found that the grain sizes on the (110) plane of Fe were 4 nm to 10 nm and 8 nm in average. In the case of the magnetic film of x/y=0.87 unlike the above-mentioned magnetic films, the grain sizes on the (110) plane of Fe were 5 nm to 11 nm and 8.5 nm in average. As for the (111) plane of Tac, the grain sizes were 4 nm to 7 nm and 5.5 nm in average. These results were in agreement with the results of measurement of the above-mentioned X-ray diffraction.

Figure 3:
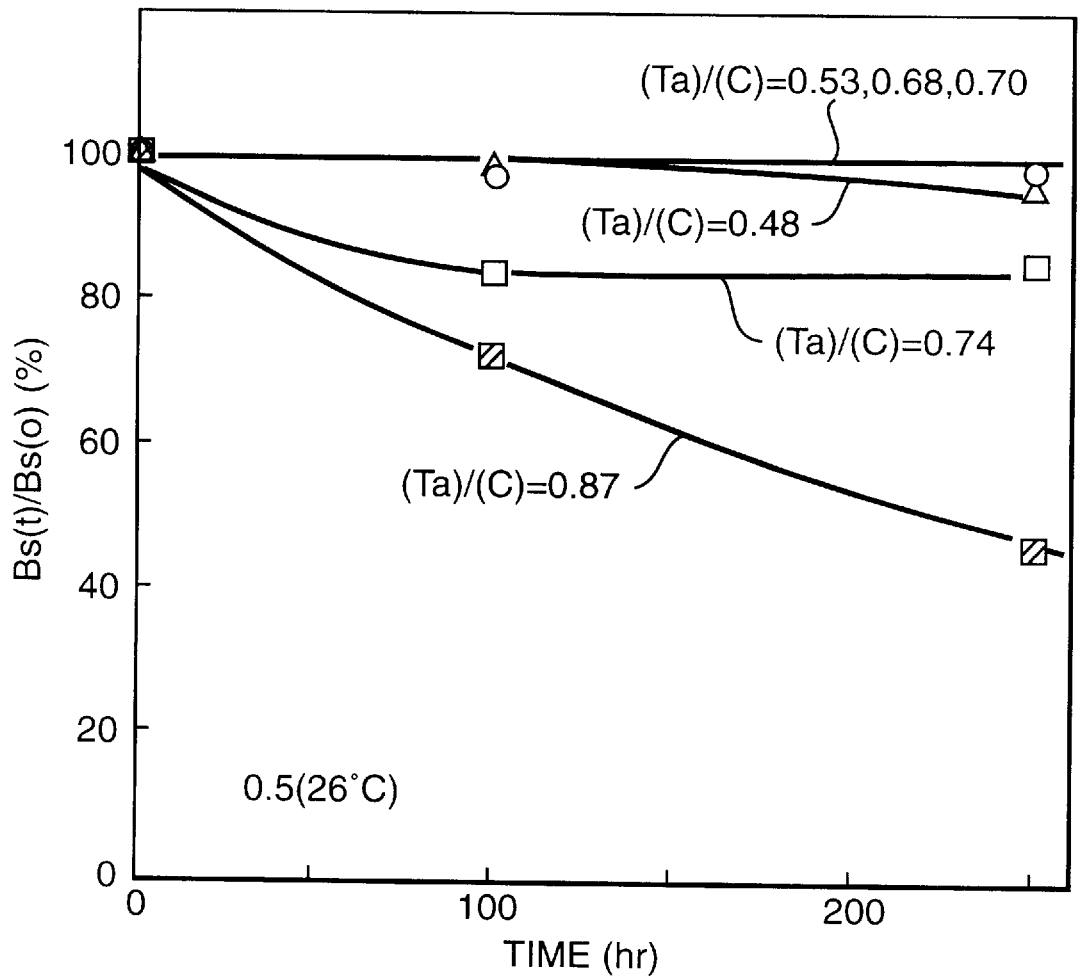
FIG. 3 illustrates the changes in saturation magnetization and time for magnetic films of various compositions which have been immersed in a 0.5N aqueous sodium chloride solution at 26° C.

The above-mentioned magnetic films having dissimilar x/y ratios were immersed in a 0.5N aqueous sodium chloride solution (26° C.), and the saturation flux densities Bs were measured with the passage of time to evaluate corrosion resistance of the magnetic films. The results were as shown in FIG. 3 from which it will be understood that, when x/y=0.48, Bs slightly decreased with the passage of the time. When x/y–0.53, 0.68 and 0.70, Bs did not change even after the films were left in this environment for more than 2000 hours. When the ratio x/y was as great as 0.74 or 0.87, furthermore, Bs was deteriorated to a considerable degree. Moreover, magnetic characteristics did not change and pitting did not occur even when the magnetic films having x/y=0.53, 0.68 and 0.70 were left in a high-temperature and high-humidity environment such as 60° C.-95% RH or 80° C.-95% RH.

From the above results, the compositions having x/y=0.50 to 0.70 are suited for obtaining films having favorable magnetic characteristics and high corrosion resistance. Among them, the composition having x/y–0.68 is best suited from the standpoint of Bs.

Next, by using the above-mentioned magnetic film, a MIG-type head having a structure schematically shown in FIGS. 4A and 4B was fabricated. To produce the magnetic head, first, a soft magnetic thin film 1 to 5 $\mu$m was formed on a single crystalline ferrite substrate 2 having a roughened surface by sputtering using Ar as a discharge gas. The magnetic film has a composition $(Fe_{78}Ta_8C_{14})_{0.9}(Cr_{60}Ru_{40})_{0.1}$. Prior to forming the magnetic film, the underlayer film of Cr, $SiO_2$, Al or $Cr_2O_3$ may be formed to a thickness of about 5 to 20 nm. The underlayer film fails to exhibit its effect when it is thinner than the above-mentioned range and, conversely, becomes a magnetic gap when it is thicker than the above-mentioned range. The gap portion 3 is formed by forming $SiO_2$ of a thickness of 200 nm on the soft magnetic thin film 1 on the ferrite substrate 2 and forming Cr to a thickness of 10 nm. This was heat-treated in a nitrogen stream at 600° C. for 30 minutes, and a head substrate was bonded thereto using a low-melting glass 4 to form a magnetic head. The heat-treating temperature is dependent upon the temperature in the glass-bonding step. The underlayer film is formed between the substrate and the magnetic film in order to improve adhesiveness between them and to control the crystal orientation of the magnetic film. This helps obtain improved recording/reproducing characteristic of when the head is fabricated as well as decrease the erasing current for obtaining a predetermined erasing ratio when the data are to be erased.

This magnetic head was used to make a VTR, and image data were recorded on tape. High-vision digital data were recorded and an S/N better than 40 dB was achieved. Here, the relative speed was 36 m/s, the data transfer rate was 46.1 Mbps, and the track width was 40 $\mu$m.

The corrosion resistance of the head was evaluated by an immersion test in which the film was immersed in a 0.5N aqueous sodium chloride solution and by a dropping test in which the film was placed in a high-temperature and high-humidity environment (60° C., relative humidity 95%). First, the MIG-type head chip was immersed in the 0.5N aqueous sodium chloride solution for 500 hours. Thereafter, the head was set to the apparatus again to measure its recording/reproducing characteristics. As a result, no difference was recognized in the recording/reproducing characteristics before and after the head was immersed. To evaluate the head by the dropping test, the MIG head was secured onto a Peltier element and was maintained at 10° C. The whole system was then left to stand in an environment with a temperature of 60° C. and a relative humidity of 95%. Dew formed on the head as a result. The head was left in such an environment for over 2000 hours, but no corrosion of the head resulted and there was no degradation in the recording characteristics or in the reproduced signals.

Although the foregoing description considered the case of a VTR, it should be understood that the present invention can also be adapted to a magnetic disk apparatus or a magnetic tape apparatus based upon a helical scanning system. Similar effects can be obtained for these other systems.

Furthermore, although an Fe—Ta—C—Cr—Ru alloy film was employed above as the magnetic film, similar results were obtained when Ta was replaced with Nb, Hf or Zr. Similar results were also obtained when Cr—Ru was replaced by Al—Si, Al, Cr—Rh or Ti—Cr.

Methods similar to the ones discussed above were used to evaluate representative magnetic thin films of different compositions which were deposited to a thickness of 5 $\mu$m by sputtering HIP-compressed targets with argon gas. The measured results are shown in Table 1. The units for each of the items listed horizontally on the top row of this table are as follows: the unit of saturation magnetization Bs is T; the unit of coercive force Hc is Oe; the unit of magnetostriction constant $\lambda$s is $10^{-6}$; and the unit of resistivity $\rho$ is $10^{-8}$ $\Omega$· m. Additionally, Bs(0) represents a value of saturation magnetization of the magnetic film, and Bs(t) represents a value of saturation magnetization of the magnetic film after it is immersed in the 0.5N aqueous sodium chloride solution for 200 hours. Therefore, numerical values (%) on the column of Bs(t)/Bs(0) represent corrosion resistance of the magnetic films. Increasing numerical values correspond to increased corrosion resistance. These units also apply to similar elements in the other Tables included below in addition to Table 1.

TABLE 1

| | Bs | Hc | $\mu$ | $\lambda$ | $\rho$ | Bs(t)/Bs(0) |
|---|---|---|---|---|---|---|
| $(Fe_{78}Nb_9C_{13})_{0.9}(Cr_{70}Ru_{30})_{0.1}$ | 1.45 | <0.1 | 2500 | 1 | 98 | 100 |
| $(Fe_{78}Hf_9C_{13})_{0.9}(Cr_{70}Ru_{30})_{0.1}$ | 1.49 | <0.1 | 3000 | 0.9 | 85 | 100 |
| $(Fe_{78}Zr_9C_{13})_{0.9}(Cr_{70}Ru)_{0.1}$ | 1.45 | <0.1 | 3000 | 2 | 93 | 100 |
| $(Fe_{78}Ta_8C_{14})_{0.9}(Cr_{70}Rh_{30})_{0.1}$ | 1.40 | <0.1 | 2000 | 2 | 88 | 100 |
| $(Fe_{78}Nb_8C_{14})_{0.91}(Cr_{70}Rh_{30})_{0.09}$ | 1.42 | <0.1 | 2000 | 1 | 89 | 100 |
| $(Fe_{79}Hf_7C_{14})_{0.9}(Cr_{70}Rh_{30})_{0.1}$ | 1.52 | <0.1 | 3000 | 0.9 | 98 | 100 |
| $(Fe_{78}Zr_8C_{14})_{0.9}(Cr_{70}Rh_{30})_{0.1}$ | 1.43 | <0.1 | 2500 | 1 | 93 | 100 |
| $(Fe_{78}Ta_8C_{14})_{0.9}Al_{10}$ | 1.43 | <0.1 | 3500 | 0.8 | 98 | 100 |
| $(Fe_{78}Nb_8C_{14})_{0.9}Al_{10}$ | 1.40 | <0.1 | 3000 | 0.9 | 95 | 100 |
| $(Fe_{79}Hf_7C_{14})_{0.9}Al_{10}$ | 1.50 | <0.1 | 3000 | 1 | 95 | 100 |
| $(Fe_{78}Zr_9C_{13})_{0.9}Al_{10}$ | 1.40 | <0.1 | 2300 | 1 | 89 | 100 |
| $(Fe_{78}Ta_9C_{13})_{0.9}(Al_{65}Si_{35})_{0.1}$ | 1.51 | <0.1 | 3800 | 0.6 | 103 | 100 |
| $(Fe_{78}Nb_9C_{13})_{0.9}(Al_{65}Si_{35})_{0.1}$ | 1.43 | <0.1 | 2900 | 0.7 | 98 | 100 |
| $(Fe_{80}Hf_7C_{13})_{0.9}(Al_{65}Si_{35})_{0.1}$ | 1.50 | <0.1 | 3000 | 0.5 | 108 | 100 |
| $(Fe_{78}Zr_9C_{13})_{0.9}(Al_{65}Si_{35})_{0.1}$ | 1.40 | <0.1 | 3000 | 0.8 | 95 | 100 |
| $(Fe_{78}Ta_9C_{13})_{0.9}(Ti_{30}Cr_{70})_{0.1}$ | 1.35 | <0.1 | 2000 | 1 | 95 | 100 |
| $(Fe_{78}Nb_9C_{13})_{0.9}(Ti_{30}Cr_{70})_{0.1}$ | 1.36 | <0.1 | 2100 | 1 | 96 | 100 |
| $(Fe_{80}Hf_7C_{13})_{0.9}(Ti_{30}Cr_{70})_{0.1}$ | 1.45 | <0.1 | 2800 | 0.9 | 97 | 100 |
| $(Fe_{78}Zr_9C_{13})_{0.9}(Ti_{30}Cr_{70})_{0.1}$ | 1.40 | <0.1 | 3000 | 1 | 95 | 100 |
| $(Fe_{78}Ta_4Nb_5C_{13})_{0.9}(Cr_{80}Ru_{20})_{0.1}$ | 1.40 | <0.1 | 2300 | 1 | 95 | 100 |
| $(Fe_{80}Ta_2Hf_5C_{13})_{0.9}(Cr_{80}Rh_{20})_{0.1}$ | 1.50 | <0.1 | 2800 | 0.8 | 95 | 100 |
| $(Fe_{78}Ta_5Zr_4C_{13})_{0.9}(Al_{10}$ | 1.45 | <0.1 | 2800 | 1 | 98 | 100 |
| $(Fe_{80}Nb_2Hf_5C_{13})_{0.9}(Al_{70}Si_{30})_{0.3}$ | 1.51 | <0.1 | 3000 | 0.7 | 98 | 100 |
| $(Fe_{80}Hf_2Zr_2C_{13})_{0.9}(Ti_{30}Cr_{70})_{0.1}$ | 1.50 | <0.1 | 2300 | 2 | 93 | 100 |

These magnetic thin films all exhibit coercive forces smaller than 0.1 Oe irrespective of their compositions. The added elements form Fe alloys in the form of intermetallic compounds or solid solution. During the heat treatment, the growth of Fe was suppressed thereby providing increased corrosion resistance while maintaining adequate magnetic characteristics. Also, heat resistance is improved.

When the thin film is represented by the equation $Fe_{100-a-b-c}X_aY_bZ_c$ (where X is at least one element selected from the group consisting of Nb, Ta, Hf and Zr and Y is one or two elements selected from the group consisting of Cr, Ru, Al, Si, Ti and Rh) but a, b and c are selected such that they lie outside the range of $5 \leq a \leq 20$, $0.5 \leq b \leq 15$, $1 \leq c \leq 20$, and $0.5 \leq a/c \leq 0.7$, then the advantageous effects of the present invention cannot be realized. In other words, the combination of magnetic characteristics and corrosion resistance are not obtained as desired, as shown in Table 2.

TABLE 2

| | Bs | Hc | $\mu$ | $\lambda$ | $\rho$ | Bs(t)/Bs(0) |
|---|---|---|---|---|---|---|
| $(Fe_{72}Ta_{14}C_{14})_{0.9}(Cr_{80}Ru_{20})_{0.1}$ | 1.28 | 0.3 | 3000 | 1 | 95 | 60 |
| $(Fe_{72}Nb_{14}C_{14})_{0.9}(Cr_{80}Ru_{20})_{0.1}$ | 1.28 | 0.3 | 2800 | 2 | 93 | 60 |

TABLE 2-continued

| | Bs | Hc | $\mu$ | $\lambda$ | $\rho$ | Bs(t)/Bs(0) |
|---|---|---|---|---|---|---|
| $(Fe_{74}Hf_{12}C_{14})_{0.9}(Cr_{80}Ru_{20})_{0.1}$ | 1.33 | 0.25 | 2900 | 1 | 97 | 60 |
| $(Fe_{72}Zr_{14}C_{14})_{0.9}(Cr_{80}Ru_{20})_{0.1}$ | 1.28 | 0.3 | 2500 | 2 | 90 | 60 |
| $(Fe_{72}Ta_{14}C_{14})_{0.9}(Cr_{80}Rh_{20})_{0.1}$ | 1.28 | 0.3 | 3100 | 2 | 95 | 60 |
| $(Fe_{72}Nb_{14}C_{14})_{0.9}(Cr_{80}Rh_{20})_{0.1}$ | 1.28 | 0.3 | 3000 | 2.5 | 93 | 60 |
| $(Fe_{74}Hf_{12}C_{14})_{0.9}(Cr_{80}Rh_{20})_{0.1}$ | 1.32 | 0.25 | 3000 | 1 | 97 | 60 |
| $(Fe_{72}Nb_{14}C_{14})_{0.9}(Cr_{80}Rh_{20})_{0.1}$ | 1.28 | 0.3 | 2900 | 2 | 91 | 60 |
| $(Fe_{72}Ta_{14}C_{14})_{0.9}Al_{10}$ | 1.35 | 0.2 | 3000 | 1 | 99 | 80 |
| $(Fe_{72}Nb_{14}C_{14})_{0.9}Al_{10}$ | 1.30 | 0.2 | 3000 | 2 | 95 | 70 |
| $(Fe_{74}Hf_{12}C_{14})_{0.9}Al_{10}$ | 1.38 | 0.2 | 3500 | 1 | 98 | 80 |
| $(Fe_{72}Nb_{14}C_{14})_{0.9}Al_{10}$ | 1.29 | 0.2 | 3000 | 1 | 97 | 70 |
| $(Fe_{78}Ta_{11}C_{11})_{0.9}(Al_{60}Si_{40})_{0.1}$ | 1.45 | <0.1 | 3500 | 0.7 | 95 | 85 |
| $(Fe_{78}Nb_{11}C_{11})_{0.9}(Al_{60}Si_{40})_{0.1}$ | 1.43 | <0.1 | 3500 | 0.8 | 95 | 78 |
| $(Fe_{78}Hf_{11}C_{11})_{0.9}(Al_{60}Si_{40})_{0.1}$ | 1.50 | <0.1 | 3800 | 0.7 | 98 | 85 |
| $(Fe_{78}Zr_{11}C_{11})_{0.9}(Al_{60}Si_{40})_{0.1}$ | 1.45 | <0.1 | 3300 | 0.8 | 95 | 78 |
| $(Fe_{78}Ta_{11}C_{11})_{0.9}(Ti_{30}Cr_{70})_{0.1}$ | 1.35 | <0.1 | 3000 | 1 | 90 | 55 |
| $(Fe_{78}Nb_{11}C_{11})_{0.9}(Ti_{30}Cr_{70})_{0.1}$ | 1.32 | <0.1 | 3500 | 2 | 89 | 55 |
| $(Fe_{78}Hf_{11}C_{11})_{0.9}(Ti_{30}Cr_{70})_{0.1}$ | 1.33 | <0.1 | 3000 | 1 | 92 | 55 |
| $(Fe_{78}Zr_{11}C_{11})_{0.9}(Ti_{30}Cr_{70})_{0.1}$ | 1.32 | <0.1 | 3200 | 2 | 92 | 55 |
| $(Fe_{78}Ta_6Nb_5C_{11})_{0.9}(Cr_{80}Ru_{20})_{0.1}$ | 1.32 | <0.1 | 2800 | 1 | 90 | 60 |
| $(Fe_{78}Ta_6Hf_5C_{11})_{0.9}(Cr_{80}Rh_{20})_{0.1}$ | 1.35 | <0.1 | 2700 | 2 | 89 | 60 |
| $(Fe_{78}Ta_6Zr_5C_{11})_{0.9}Al_{10}$ | 1.30 | <0.1 | 2600 | 2 | 92 | 55 |
| $(Fe_{78}Nb_6Hf_5C_{11})_{0.9}(Al_{60}Si_{40})_{0.1}$ | 1.35 | <0.1 | 2700 | 1 | 91 | 60 |
| $(Fe_{78}Hf_5Zr_6C_{11})_{0.9}(Ti_{30}Cr_{70})_{0.1}$ | 1.32 | <0.1 | 2800 | 1 | 90 | 60 |

When Fe was replaced with Co, the results were substantially the same except that when Co was used the saturation magnetization Bs simply became smaller by about 0.1 T as compared to the case where Fe was used.

Representative magnetic thin films of different compositions, deposited to a thickness of 5 $\mu$m by sputtering of HIP-compressed targets with argon gas in the same manner as described above, were evaluated for their magnetic characteristics and corrosion resistance by methods similar to those mentioned above. The measured results are as shown in Table 3. The units of measurement are the same as those for the other Tables shown herein. In other words, the unit of saturation magnetization Bs is T, the unit of coercive force Hc is Oe, the magnetic permeability $\mu$ is a value at 1 MHz, the unit of magnetostriction constant $\lambda$s is $10^{-6}$, and the unit of resistivity $\rho$ is $10^{-8}$ $\Omega$.m. Moreover, Bs(0) represents a value of saturation magnetization of the magnetic film, and Bs(t) represents a value of saturation flux density of the magnetic film after it is immersed in the 0.5N aqueous sodium chloride solution for 200 hours.

TABLE 3

| | Bs | Hc | $\mu$ | $\lambda$ | $\rho$ | Bs(t)/Bs(0) |
|---|---|---|---|---|---|---|
| $(Co_{78}Ta_9C_{13})_{0.9}(Cr_{70}Ru_{30})_{0.1}$ | 1.35 | <0.1 | 2000 | 1 | 90 | 100 |
| $(Co_{78}Nb_9C_{13})_{0.9}(Cr_{70}Ru_{30})_{0.1}$ | 1.35 | <0.1 | 2000 | 1 | 90 | 100 |
| $(Co_{78}Hf_9C_{13})_{0.9}(Cr_{70}Ru_{30})_{0.1}$ | 1.39 | <0.1 | 2300 | 0.9 | 93 | 100 |
| $(Co_{78}Zr_9C_{13})_{0.9}(Cr_{70}Ru_{30})_{0.1}$ | 1.35 | <0.1 | 2100 | 1 | 83 | 100 |
| $(Co_{78}Ta_9C_{14})_{0.9}(Cr_{70}Rh_{30})_{0.1}$ | 1.30 | <0.1 | 2000 | 1 | 88 | 100 |
| $(Co_{78}Nb_8C_{14})_{0.91}(Cr_{70}Rh_{30})_{0.09}$ | 1.32 | <0.1 | 2000 | 1 | 83 | 100 |
| $(Co_{79}Hf_7C_{14})_{0.9}(Cr_{70}Rh_{30})_{0.1}$ | 1.40 | <0.1 | 2300 | 0.9 | 85 | 100 |
| $(Co_{78}Zr_8C_{14})_{0.9}(Cr_{70}Rh_{30})_{0.1}$ | 1.33 | <0.1 | 2000 | 1 | 80 | 100 |
| $(Co_{78}Ta_8C_{14})_{0.9}Al_{10}$ | 1.33 | <0.1 | 2100 | 1 | 98 | 100 |
| $(Co_{78}Nb_8C_{14})_{0.9}Al_{10}$ | 1.30 | <0.1 | 2000 | 1 | 99 | 100 |
| $(Co_{79}Hf_7C_{14})_{0.9}Al_{10}$ | 1.40 | <0.1 | 2400 | 1 | 103 | 100 |
| $(Co_{78}Zr_9C_{13})_{0.9}Al_{10}$ | 1.30 | <0.1 | 2000 | 2 | 97 | 100 |
| $(Co_{78}Ta_9C_{13})_{0.9}(Al_{65}Si_{35})_{0.1}$ | 1.41 | <0.1 | 2800 | 0.6 | 98 | 100 |
| $(Co_{78}Nb_9C_{13})_{0.9}(Al_{65}Si_{35})_{0.1}$ | 1.33 | <0.1 | 2600 | 0.8 | 93 | 100 |
| $(Co_{80}Hf_7C_{13})_{0.9}(Al_{65}Si_{35})_{0.1}$ | 1.40 | <0.1 | 3000 | 0.4 | 105 | 100 |
| $(Co_{78}Zr_9C_{13})_{0.9}(Al_{65}Si_{35})_{0.1}$ | 1.30 | <0.1 | 2700 | 0.8 | 97 | 100 |
| $(Co_{78}Ta_9C_{13})_{0.9}(Ti_{30}Cr_{70})_{0.1}$ | 1.25 | <0.1 | 2100 | 1 | 90 | 100 |
| $(Co_{78}Nb_9C_{13})_{0.9}(Ti_{30}Cr_{70})_{0.1}$ | 1.26 | <0.1 | 2100 | 1 | 90 | 100 |
| $(Co_{80}Hf_7C_{13})_{0.9}(Ti_{30}Cr_{70})_{0.1}$ | 1.35 | <0.1 | 2300 | 1 | 88 | 100 |
| $(Co_{78}Zr_9C_{13})_{0.9}(Ti_{30}Cr_{70})_{0.1}$ | 1.30 | <0.1 | 2800 | 1 | 85 | 100 |
| $(Co_{78}Ta_4Nb_5C_{13})_{0.9}(Cr_{30}Ru_{20})_{0.1}$ | 1.30 | <0.1 | 1900 | 1 | 88 | 100 |
| $(Co_{80}Ta_2Hf_5C_{13})_{0.9}(Cr_{80}Rh_{20})_{0.1}$ | 1.40 | <0.1 | 1800 | 1 | 88 | 100 |
| $(Co_{78}Ta_5Zr_4C_{13})_{0.9}Al_{10}$ | 1.35 | <0.1 | 1800 | 1 | 85 | 100 |
| $(Co_{80}Nb_2Hf_5C_{13})_{0.9}(Al_{70}Si_{30})_{0.1}$ | 1.41 | <0.1 | 2000 | 0.8 | 83 | 100 |
| $(Co_{80}Hf_5Zr_2C_{13})_{0.9}(Ti_{30}Cr_{70})_{0.1}$ | 1.40 | <0.1 | 1900 | 1 | 90 | 100 |

These magnetic thin films all exhibit coercive forces Hc smaller than 0.1 Oe irrespective of their compositions. The added elements form Co alloys in the form of intermetallic compounds or a solid solution. Because the growth of Co crystals was suppressed during the heat treatment, the corrosion resistance was improved without decreasing the magnetic characteristics. The heat resistance was also improved.

When the composition of the magnetic thin film represented by $Co_{100-a-b-c}X_aY_bC_c$ (where X is at least one element selected from the group of Nb, Ta, Hf and Zr, and Y is one or two elements selected from the group of Cr, Ru, Al, Si, Ti and Rh) lies outside the ranges of $5 \leq a \leq 20$, $0.5 \leq b \leq 15$, $1 \leq c \leq 20$, and $0.5 \leq a/c \leq 0.7$, it is no longer possible to simultaneously realize both the desired soft magnetic characteristics and the corrosion resistance as shown in Table 4. The units of measurement as the same as for the other Tables shown.

TABLE 4

| | Bs | Hc | $\mu$ | $\lambda$ | $\rho$ | Bs(t)/Bs(O) |
|---|---|---|---|---|---|---|
| $(Co_{72}Ta_{14}C_{14})_{0.9}(Cr_{80}Ru_{20})_{0.1}$ | 1.18 | 0.4 | 2000 | 1 | 78 | 65 |
| $(Co_{72}Nb_{14}C_{14})_{0.9}(Cr_{80}Ru_{20})_{0.1}$ | 1.18 | 0.4 | 2500 | 1 | 88 | 65 |
| $(Co_{74}Hf_{12}C_{14})_{0.9}(Cr_{80}Ru_{20})_{0.1}$ | 1.23 | 0.2 | 2600 | 1 | 80 | 65 |
| $(Co_{72}Zr_{14}C_{14})_{0.9}(Cr_{80}Ru_{20})_{0.1}$ | 1.38 | 0.4 | 2800 | 1 | 83 | 65 |
| $(Co_{72}Ta_{14}C_{14})_{0.9}(Cr_{80}Rh_{20})_{0.1}$ | 1.18 | 0.4 | 2500 | 1 | 90 | 65 |
| $(Co_{72}Nb_{14}C_{14})_{0.9}(Cr_{80}Rh_{20})_{0.1}$ | 1.18 | 0.4 | 2000 | 1 | 93 | 65 |
| $(Co_{74}Hf_{12}C_{14})_{0.9}(Cr_{80}Rh_{20})_{0.1}$ | 1.22 | 0.4 | 2500 | 1 | 97 | 65 |
| $(Co_{72}Zr_{14}C_{14})_{0.9}(Cr_{80}Rh_{20})_{0.1}$ | 1.18 | 0.4 | 1800 | 1 | 91 | 65 |
| $(Co_{72}Ta_{14}C_{14})_{0.9}Al_{10}$ | 1.25 | 0.2 | 3300 | 1 | 98 | 85 |
| $(Co_{72}Nb_{14}C_{14})_{0.9}Al_{10}$ | 1.20 | 0.2 | 3200 | 1 | 96 | 75 |
| $(Co_{74}Hf_{12}C_{14})_{0.9}Al_{10}$ | 1.28 | 0.2 | 3200 | 1 | 99 | 85 |
| $(Co_{72}Zr_{14}C_{14})_{0.9}Al_{10}$ | 1.19 | 0.2 | 3100 | 1 | 95 | 80 |
| $(Co_{78}Ta_{11}C_{11})_{0.9}(Al_{60}Si_{40})_{0.1}$ | 1.35 | <0.1 | 3100 | 0.7 | 95 | 85 |
| $(Co_{78}Nb_{11}C_{11})_{0.9}(Al_{60}Si_{40})_{0.1}$ | 1.33 | <0.1 | 2900 | 0.9 | 90 | 85 |
| $(Co_{78}Hf_{11}C_{11})_{0.9}(Al_{60}Si_{40})_{0.1}$ | 1.40 | <0.1 | 2800 | 0.5 | 98 | 85 |
| $(Co_{78}Zr_{11}C_{11})_{0.9}(Al_{60}Si_{40})_{0.1}$ | 1.35 | <0.1 | 2500 | 0.9 | 90 | 85 |
| $(Co_{78}Ta_{11}C_{11})_{0.9}(Ti_{30}Cr_{70})_{0.1}$ | 1.25 | <0.1 | 3000 | 1 | 93 | 65 |
| $(Co_{78}Nb_{11}C_{11})_{0.9}(Ti_{30}Cr_{70})_{0.1}$ | 1.22 | <0.1 | 2800 | 1 | 90 | 65 |
| $(Co_{78}Hf_{11}C_{11})_{0.9}(Ti_{30}Cr_{70})_{0.1}$ | 1.23 | <0.1 | 3100 | 1 | 98 | 65 |
| $(Co_{78}Zr_{11}C_{11})_{0.9}(Ti_{30}Cr_{70})_{0.1}$ | 1.22 | <0.1 | 2800 | 1 | 90 | 65 |
| $(Co_{78}Ta_6Nb_5C_{11})_{0.9}(Cr_{80}Ru_{20})_{0.1}$ | 1.22 | <0.1 | 2000 | 1 | 90 | 70 |
| $(Co_{78}Ta_6Hf_5C_{11})_{0.9}(Cr_{80}Ru_{20})_{0.1}$ | 1.25 | <0.1 | 2100 | 1 | 92 | 70 |
| $(Co_{78}Ta_6Zr_5C_{11})_{0.9}Al_{10}$ | 1.20 | <0.1 | 2000 | 1 | 89 | 60 |
| $(Co_{78}Nb_6Hf_5C_{11})_{0.9}(Al_{60}Si_{40})_{0.1}$ | 1.25 | <0.1 | 2300 | 0.6 | 95 | 65 |
| $(Co_{78}Hf_5Zr_6C_{11})_{0.9}(Ti_{30}Cr_{30})_{0.1}$ | 1.22 | <0.1 | 2200 | 0.6 | 95 | 65 |

A magnetic recording medium was prepared by using an Fe—Ta—N—Cr—Ru alloy film as a magnetic thin film.

The magnetic film was formed by sputtering using an Ar/$N_2$ mixture gas as a discharge gas. Powders of elements, i.e., Fe, Ta, Cr and Ru and nitrides thereof were molded by the hot isostatic press method (HIP method) and were used as targets for sputtering. The partial pressure of the $N_2$ gas was adjusted to change the concentration ratio x/y of Ta and N to be 0.48, 0.55, 0.68, 0.70, 0.75, 0.88 and to change the composition of the magnetic thin films. In order to provide a sample for measuring the magnetic characteristics, a magnetic film was formed on a crystallized glass substrate having its surface optically polished. The sputtering conditions vary depending upon the sputtering apparatus and the like. In this embodiment, however, the sputtering conditions include a discharge gas pressure of 5 mTorr and an RF power of 400 W/150 mm$\phi$. The magnetic film was formed to a thickness of 5 $\mu$m and heat-treated in an Ar atmosphere at 590° C. for 30 minutes.

Magnetic films having the following composition of $(Fe_{100-x-y}Ta_xN_y)_{0.9}(Cr_8Ru_2)_{0.1}$ where x+y=20 to 30 and x/y=0.48, 0.55, 0.68, 0.70, 0.75 and 0.88 were examined for their changes in the saturation magnetization Bs. The results were as shown in FIG. 5. The saturation magnetization Bs increases with an increase in the value x/y and becomes a maximum at x/y=0.68 and Bs at 1.5 T. As the value x/y further increases, Bs decreases. Accordingly, Bs varies depending upon the value x/y. As shown in FIG. 5, to obtain a large Bs, the value x/y should lie within a range of 0.50 to 0.90. The coercive force Hc was 0.1 Oe when x/y=0.68 and, in this case, the magnetic permeability $\mu$ was 2300 (1 MHz), the magnetostriction constant $\lambda$x was $1.5 \times 10^{-6}$, and the resistivity $\rho$ was $95 \times 10^{-8}$ $\Omega$.m.

The grain sizes of the magnetic films were examined by using a transmission electron microscope. Grain sizes of the magnetic films on the (110) plane of Fe were in the range of 4 nm to 10 nm and averaged approximately 8 nm when x/y=0.48 to 0.70. The grain sizes on the (111) plane of TaN were in the range of 2 nm to 5 nm and averaged 3 nm. But when the ratio of x/y=0.88, the grain sizes on the (110) plane of Fe were 5 nm to 11 nm and averaged 8.5 nm. As for the (111) plane of TaN, the grain sizes were 4 nm to 7 nm and averaged 5.5 nm.

The above-mentioned magnetic films having dissimilar x/y ratios were immersed in a 0.5N aqueous sodium chloride solution, and the saturation flux densities Bs were measured with the passage of time to evaluate corrosion resistance of the magnetic films. When x/y=0.48, Bs decreased with the passage of the time by 5% from its the initial value after 200 hours. When x/y=0.55 to 0.70, Bs remained unchanged even after the films were left in this environment for more than 2000 hours. Furthermore, when the ratio x/y was as great as 0.75 or 0.88, Bs deteriorated to a considerable degree. Moreover, magnetic characteristics remained unchanged and no pitting occurred even when the magnetic films having ratios of x/y=0.55, 0.68 and 0.70 were left in a high temperature and high relative humidity environment such as 60° C.-95% RH or 80° C.-95% RH .

The results obtained make it clear that the compositions having x/y=0.50 to 0.70 are suited for obtaining films having favorable magnetic characteristics and high corrosion resistance. Among them, the composition having x/y of about 0.68 is best suited from the standpoint of Bs.

Next, the above-mentioned magnetic film was used to make a metal-in-gap (MIG) type of head having a structure schematically shown in FIGS. 4A and 4B. In order to produce the magnetic head, a soft magnetic thin film 1 was formed on a single-crystal ferrite substrate 2 having a roughened surface formed by sputtering using an Ar/N$_2$ mixture gas as a discharge gas. The magnetic film has a composition of $(Fe_{78}Ta_9C_{13})_{0.9}(Cr_8Ru_2)_{0.1}$ which corresponded to the above-mentioned composition having x/y=0.69. The gap portion 3 was formed by depositing SiO$_2$ to a thickness of 200 nm on the soft magnetic thin film 1 and depositing Cr thereon to a thickness of 100 nm. This structure was heat-treated in a nitrogen stream at 600° C. for 60 minutes. Then, a head same shape was bonded thereto using a low-melting point glass 4 to form a magnetic head.

The heat-treating temperature is dependent upon the temperature of the glass-bonding step. To improve adhesion between the substrate and the magnetic film, a junction layer may be provided. This junction layer may be a metal layer of Cr or Al having a thickness of, for example, about 5 nm to 20 nm. Alternatively, the junction layer may be an inorganic compound layer such as of SiO$_2$, Cr$_2$O$_3$ or the like.

This magnetic head was used to make a VTR, and image data were recorded on tape. High-vision digital data were recorded and signal-to-noise (S/N) ratios better than 40 dB were achieved. Here, the relative speed was 36 m/s, the data transfer rate was 46.1 Mbps, and the track width was 40 μm.

The corrosion resistance of the head was evaluated by an immersion test in which the film was immersed in a 0.5N aqueous sodium chloride solution. The corrosion resistance was also evaluated using a dropping test in which the film was placed in a high temperature and high relative humidity environment (60° C., relative humidity of 95%). First, the MIG-type head chip was immersed in the 0.5N aqueous sodium chloride solution for 500 hours. Thereafter, the recording/reproducing characteristics of the head were measured. A result of this measurement step revealed that no recognizable difference existed in the recording/reproducing characteristics before and after the head was immersed. In order to evaluate the head using the dropping test, the MIG head was secured onto a Peltier element and was maintained at 10° C. The whole system was then left in an environment with a temperature of 60° C. and a relative humidity of 95%. Dew formed over the entire head as a result. The head was left in this environment for over 2000 hours, but no corrosion occurred. Also no degradation occurred in either the recording characteristics or the reproduced signals.

By way of example, an Fe—Ta—N—Cr—Ru alloy film was used as a magnetic film. However, the same effects were obtained when Ta was replaced by Nb, Hf or Zr and when Cr—Ru was replaced by Al—Si, Al, Cr—Rh or Ti—Cr as described below.

Representative magnetic thin films of different compositions, deposited to a thickness of 5 μm by sputtering of HIP-compressed targets with an Ar/N$_2$ mixture gas as described above, were evaluated for their magnetic characteristics and corrosion resistance by methods similar to those mentioned above. The measured results are as shown in Table 5, wherein the units are the same as those for the other Tables contained herein.

TABLE 5

| | Bs | Hc | μ | λ | ρ | Bs(t)/Bs(0) |
|---|---|---|---|---|---|---|
| $(Fe_{78}Nb_9N_{13})_{0.9}(Cr_{70}Ru_{30})_{0.1}$ | 1.45 | <0.1 | 2500 | 1 | 98 | 100 |
| $(Fe_{78}Hf_9N_{13})_{0.9}(Cr_{70}Ru_{30})_{0.1}$ | 1.49 | <0.1 | 3000 | 0.9 | 85 | 100 |
| $(Fe_{78}Zr_9N_{13})_{0.9}(Cr_{70}Ru_{30})_{0.1}$ | 1.45 | <0.1 | 2000 | 2 | 93 | 100 |
| $(Fe_{78}Ta_8N_{14})_{0.9}(Cr_{70}Rh_{30})_{0.1}$ | 1.40 | <0.1 | 2000 | 2 | 88 | 100 |
| $(Fe_{78}Nb_8N_{14})_{0.91}(Cr_{70}Rh_{30})_{0.09}$ | 1.42 | <0.1 | 2000 | 1 | 89 | 100 |
| $(Fe_{79}Hf_7N_{14})_{0.9}(Cr_{70}Rh_{30})_{0.1}$ | 1.52 | <0.1 | 3000 | 0.9 | 98 | 100 |
| $(Fe_{78}Zr_8N_{14})_{0.9}(Cr_{70}Rh_{30})_{0.1}$ | 1.43 | <0.1 | 2500 | 1 | 93 | 100 |
| $(Fe_{78}Ta_6N_{14})_{0.9}Al_{0.1}$ | 1.43 | <0.1 | 3500 | 0.8 | 98 | 100 |
| $(Fe_{78}Nb_8N_{14})_{0.9}Al_{0.1}$ | 1.40 | <0.1 | 3000 | 0.9 | 95 | 100 |
| $(Fe_{79}Hf_7N_{14})_{0.9}Al_{0.1}$ | 1.50 | <0.1 | 3000 | 1 | 95 | 100 |
| $(Fe_{78}Zr_9N_{13})_{0.9}Al_{0.1}$ | 1.40 | <0.1 | 2300 | 1 | 89 | 100 |
| $(Fe_{78}Ta_9N_{13})_{0.9}(Al_{65}Si_{35})_{0.1}$ | 1.51 | <0.1 | 2900 | 0.6 | 103 | 100 |
| $(Fe_{78}Nb_9N_{13})_{0.9}(Al_{65}Si_{35})_{0.1}$ | 1.43 | <0.1 | 2900 | 0.7 | 98 | 100 |
| $(Fe_{80}Hf_7N_{13})_{0.9}(Al_{65}Si_{35})_{0.1}$ | 1.50 | <0.1 | 3000 | 0.5 | 108 | 100 |
| $(Fe_{78}Zr_9N_{13})_{0.9}(Al_{65}Si_{35})_{0.1}$ | 1.40 | <0.1 | 3000 | 0.8 | 95 | 100 |
| $(Fe_{78}Ta_9N_{13})_{0.9}(Al_{30}Cr_{70})_{0.1}$ | 1.35 | <0.1 | 2000 | 1 | 95 | 100 |
| $(Fe_{78}Nb_9N_{13})_{0.9}(Ti_{30}Cr_{70})_{0.1}$ | 1.36 | <0.1 | 2100 | 1 | 96 | 100 |
| $(Fe_{80}Hf_7N_{13})_{0.9}(Ti_{30}Cr_{70})_{0.1}$ | 1.45 | <0.1 | 2800 | 0.9 | 97 | 100 |
| $(Fe_{78}Zr_9N_{13})_{0.9}(Ti_{30}Cr_{70})_{0.1}$ | 1.40 | <0.1 | 3000 | 1 | 95 | 100 |
| $(Fe_{78}Ta_4Nb_5N_{13})_{0.9}(Cr_{80}Ru_{20})_{0.1}$ | 1.40 | <0.1 | 2300 | 1 | 95 | 100 |
| $(Fe_{80}Ta_2Hf_5N_{13})_{0.9}(Cr_{80}Ru_{20})_{0.1}$ | 1.50 | '10.1 | 2800 | 0.8 | 95 | 100 |
| $(Fe_{78}Ta_5Zr_4N_{13})_{0.9}Al_{0.1}$ | 1.45 | <0.1 | 2800 | 1 | 98 | 100 |
| $(Fe_{80}Nb_2Hf_5N_{13})_{0.9}(Al_{70}Si_{30})_{0.1}$ | 1.51 | '10.1 | 3000 | 0.7 | 98 | 100 |
| $(Fe_{80}Hf_5Zr_2N_{13})_{0.9}(Ti_{10}Cr_{70})_{0.1}$ | 1.50 | <0.1 | 2300 | 2 | 93 | 100 |

As is obvious from Table 5, magnetic characteristics of the magnetic film change very little even when N is substituted for C. Even in these magnetic films, the added elements form Fe alloys in the form of intermetallic compounds or solid solution. During the heat treatment, the growth of Fe crystals is suppressed so the corrosion resistance is improved without decreasing the magnetic characteristics. Of course, heat resistance is also improved.

Even in these Fe—N type magnetic films, when the composition of the magnetic thin film represented by $Fe_{100-a-b-c}X_aY_bC_c$ (where X is at least one element selected from the group of Nb, Ta, Hf and Zr, and Y is one or two elements selected from the group of Cr, Ru, Al, Si, Ti and Rh) lies outside the ranges of $5 \leq a \leq 20$, $0.5 \leq b \leq 15$, $1 \leq c \leq 20$, and $0.5 \leq a/c \leq 0.7$, it is no longer possible to simultaneously realize both the desired soft magnetic characteristics and the corrosion resistance as evidenced in Table 6 below. The units used in the Table 6 are the same as those used in the other Tables.

TABLE 6

| | Bs | Hc | $\mu$ | $\lambda$ | $\rho$ | Bs(t)/Bs(O) |
|---|---|---|---|---|---|---|
| $(Fe_{72}Ta_{14}N_{14})_{0.9}(Cr_{80}Ru_{20})_{0.1}$ | 1.28 | 0.3 | 3000 | 1 | 95 | 60 |
| $(Fe_{72}Nb_{14}N_{14})_{0.9}(Cr_{80}Ru_{20})_{0.1}$ | 1.28 | 0.3 | 2800 | 2 | 93 | 60 |
| $(Fe_{74}Hf_{12}N_{14})_{0.9}(Cr_{80}Ru_{20})_{0.1}$ | 1.33 | 0.25 | 2900 | 1 | 97 | 60 |
| $(Fe_{72}Zr_{14}N_{14})_{0.9}(Cr_{80}Ru_{20})_{0.1}$ | 1.28 | 0.3 | 2500 | 2 | 90 | 60 |
| $(Fe_{72}Ta_{14}N_{14})_{0.91}(Cr_{80}Rh_{20})_{0.1}$ | 1.28 | 0.3 | 3100 | 2 | 95 | 60 |
| $(Fe_{72}Nb_{14}N_{14})_{0.9}(Cr_{80}Rh_{20})_{0.1}$ | 1.28 | 0.3 | 3000 | 2.5 | 93 | 60 |
| $(Fe_{74}Hf_{12}N_{14})_{0.9}(Cr_{80}Rh_{20})_{0.1}$ | 1.32 | 0.25 | 3000 | 1 | 97 | 60 |
| $(Fe_{72}Zr_{14}N_{14})_{0.9}(Cr_{80}Rh_{20})_{0.1}$ | 1.28 | 0.3 | 2900 | 2 | 91 | 60 |
| $(Fe_{72}Ta_{14}N_{14})_{0.9}Al_{0.1}$ | 1.35 | 0.2 | 3000 | 1 | 99 | 80 |
| $(Fe_{72}Nb_{14}N_{14})_{0.9}Al_{0.1}$ | 1.30 | 0.2 | 3000 | 2 | 95 | 70 |
| $(Fe_{74}Hf_{12}N_{14})_{0.9}Al_{0.1}$ | 1.38 | 0.2 | 3500 | 1 | 98 | 80 |
| $(Fe_{72}Zr_{14}N_{14})_{0.9}Al_{0.1}$ | 1.29 | 0.2 | 3000 | 1 | 97 | 70 |
| $(Fe_{78}Ta_{11}N_{11})_{0.9}(Al_{60}Si_{40})_{0.1}$ | 1.45 | <0.1 | 3500 | 0.7 | 95 | 85 |
| $(Fe_{78}Nb_{11}N_{11})_{0.9}(Al_{60}Si_{40})_{0.1}$ | 1.43 | <0.1 | 3500 | 0.8 | 95 | 78 |
| $(Fe_{78}Hf_{11}N_{11})_{0.9}(Al_{60}Si_{40})_{0.1}$ | 1.50 | <0.1 | 3800 | 0.7 | 98 | 85 |
| $(Fe_{78}Zr_{11}N_{11})_{0.9}(Al_{60}Si_{40})_{0.1}$ | 1.45 | <0.1 | 3300 | 0.8 | 95 | 78 |
| $(Fe_{78}Ta_{11}N_{11})_{0.9}(Al_{30}Cr_{70})_{0.1}$ | 1.35 | <0.1 | 3000 | 1 | 90 | 55 |
| $(Fe_{78}Nb_{11}N_{11})_{0.9}(Ti_{30}Cr_{70})_{0.1}$ | 1.32 | <0.1 | 3500 | 2 | 89 | 55 |
| $(Fe_{78}Hf_{11}N_{11})_{0.9}(Ti_{30}Cr_{70})_{0.1}$ | 1.33 | <0.1 | 3000 | 1 | 92 | 55 |
| $(Fe_{78}Zr_{11}N_{11})_{0.9}(Ti_{30}Cr_{70})_{0.1}$ | 1.32 | <0.1 | 3200 | 2 | 92 | 55 |
| $(Fe_{78}Ta_{6}Nb_{5}N_{11})_{0.9}(Cr_{80}Ru_{20})_{0.1}$ | 1.32 | <0.1 | 2800 | 1 | 90 | 60 |
| $(Fe_{78}Ta_{6}Hf_{5}N_{11})_{0.9}(Cr_{80}Rh_{20})_{0.1}$ | 1.35 | <0.1 | 2700 | 2 | 89 | 60 |
| $(Fe_{78}Ta_{6}Zr_{5}N_{11})_{0.9}Al_{0.1}$ | 1.30 | <0.1 | 2600 | 2 | 92 | 55 |
| $(Fe_{78}Nb_{6}Hf_{5}N_{11})_{0.9}(Al_{60}Si_{40})_{0.1}$ | 1.35 | <0.1 | 2700 | 1 | 91 | 60 |
| $(Fe_{78}Hf_{5}Zr_{6}N_{11})_{0.9}(Ti_{30}Cr_{70})_{0.1}$ | 1.32 | <0.1 | 2800 | 1 | 90 | 60 |

Even in the Co—N type magnetic films where Fe was replaced by Co, the soft magnetic film exhibited similar characteristics except that the saturation magnetization Bs became smaller by about 0.1 T than in the case of Fe.

Representative magnetic thin films of different compositions, deposited to a thickness of 5 $\mu$m by sputtering of HIP-compressed targets with an Ar/N$_2$ mixture gas as described above, were evaluated for their magnetic characteristics and corrosion resistance by methods similar to those mentioned above. The measured results are as shown in Table 7, wherein the units of measurement are the same as for the other Tables.

TABLE 7

| | Bs | Hc | $\mu$ | $\lambda$ | $\rho$ | Bs(t)/Bs(O) |
|---|---|---|---|---|---|---|
| $(Co_{78}Ta_{9}N_{13})_{0.9}(Cr_{70}Ru_{30})_{0.1}$ | 1.35 | <0.1 | 2000 | 1 | 90 | 100 |
| $(Co_{78}Nb_{9}N_{13})_{0.9}(Cr_{70}Ru_{30})_{0.1}$ | 1.35 | <0.1 | 2000 | 1 | 90 | 100 |
| $(Co_{78}Hf_{9}N_{13})_{0.9}(Cr_{70}Ru_{30})_{0.1}$ | 1.39 | <0.1 | 2300 | 0.9 | 93 | 100 |
| $(Co_{78}Zr_{9}N_{13})_{0.9}(Cr_{70}Ru_{30})_{0.1}$ | 1.35 | <0.1 | 2100 | 1 | 83 | 100 |
| $(Co_{78}Ta_{8}N_{14})_{0.9}(Cr_{70}R_{30})_{0.1}$ | 1.30 | <0.1 | 2000 | 1 | 83 | 100 |
| $(Co_{78}Nb_{8}N_{14})_{0.91}(Cr_{70}Rh_{30})_{0.09}$ | 1.32 | <0.1 | 2000 | 1 | 83 | 100 |
| $(Co_{79}Hf_{7}N_{14})_{0.9}(Cr_{70}R_{30})_{0.1}$ | 1.40 | <0.1 | 2300 | 0.9 | 85 | 100 |
| $(Co_{78}Zr_{8}N_{14})_{0.9}(Cr_{70}Rh_{30})_{0.1}$ | 1.35 | <0.1 | 2000 | 1 | 80 | 100 |
| $(Co_{78}Ta_{8}N_{14})_{0.9}Al_{0.1}$ | 1.33 | <0.1 | 2100 | 1 | 98 | 100 |
| $(Co_{78}Nb_{8}N_{14})_{0.9}Al_{0.1}$ | 1.30 | <0.1 | 2000 | 1 | 99 | 100 |
| $(Co_{79}Hf_{7}N_{14})_{0.9}Al_{0.1}$ | 1.40 | <0.1 | 2400 | 2 | 103 | 100 |
| $(Co_{78}Zr_{9}N_{13})_{0.9}Al_{0.1}$ | 1.30 | <0.1 | 2000 | 2 | 97 | 100 |
| $(Co_{78}Ta_{9}N_{13})_{0.9}(Al_{65}Si_{35})_{0.1}$ | 1.41 | <0.1 | 2800 | 0.6 | 98 | 100 |
| $(Co_{78}Nb_{9}N_{13})_{0.9}(Al_{65}Si_{35})_{0.1}$ | 1.33 | <0.1 | 2600 | 0.8 | 93 | 100 |
| $(Co_{80}Hf_{7}N_{13})_{0.9}(Al_{65}Si_{35})_{0.1}$ | 1.40 | <0.1 | 3000 | 0.4 | 105 | 100 |
| $(Co_{78}Zr_{9}N_{13})_{0.9}(Al_{65}Si_{35})_{0.1}$ | 1.30 | <0.1 | 2700 | 0.8 | 97 | 100 |
| $(Co_{78}Ta_{9}N_{13})_{0.9}(Ti_{30}Cr_{70})_{0.1}$ | 1.30 | <0.1 | 2100 | 1 | 90 | 100 |
| $(Co_{78}Nb_{9}N_{13})_{0.9}(Ti_{30}Cr_{70})_{0.1}$ | 1.26 | <0.1 | 2300 | 1 | 88 | 100 |
| $(Co_{80}Hf_{7}N_{13})_{0.9}(Ti_{30}Cr_{70})_{0.1}$ | 1.35 | <0.1 | 2800 | 1 | 85 | 100 |
| $(Co_{78}Zr_{9}N_{13})_{0.9}(Ti_{30}Cr_{70})_{0.1}$ | 1.30 | <0.1 | 1900 | 1 | 88 | 100 |
| $(Co_{78}Ta_{4}Nb_{5}N_{13})_{0.9}(Cr_{80}Ru_{20})_{0.1}$ | 1.25 | <0.1 | 1900 | 1 | 90 | 100 |
| $(Co_{80}Ta_{2}Hf_{5}N_{13})_{0.9}(Cr_{80}Rh_{20})_{0.1}$ | 1.40 | <0.1 | 1800 | 1 | 88 | 100 |
| $(Co_{78}Ta_{5}Zr_{4}N_{13})_{0.9}Al_{0.1}$ | 1.35 | <0.1 | 1800 | 1 | 85 | 100 |
| $(Co_{80}Nb_{2}Hf_{5}N_{13})_{0.9}(Al_{70}Si_{30})_{0.1}$ | 1.41 | <0.1 | 2000 | 0.8 | 83 | 100 |
| $(Co_{80}Hf_{5}Zr_{2}N_{13})_{0.9}(Ti_{30}Cr_{70})_{0.1}$ | 1.40 | <0.1 | 1900 | 1 | 90 | 1000 |

These magnetic thin films all exhibit coercive forces Hc smaller than 0.1 Oe irrespective of their compositions. The added elements form Co alloys in the form of intermetallic compounds or solid solutions. During the heat treatment, the growth of Co crystals is suppressed so the corrosion resistance is improved without decreasing the magnetic characteristics. Of course, the heat resistance is also improved.

When the composition of the magnetic thin film represented by $Co_{100-a-b-c}X_aY_bC_c$ (where X is at least one element selected from the group of Nb, Ta, Hf and Zr, and Y is one or two elements selected from the group of Cr, Ru, Al, Si, Ti and Rh) lies outside the ranges of $5 \leq a \leq 20$, $0.5 \leq b \leq 15$, $1 \leq c \leq 20$, and $0.5 \leq a/c \leq 0.7$, it is no longer possible to simultaneously realize both the desired soft magnetic characteristics and the corrosion resistance as shown in Table 8 below. The units of measurement are the same here as for the other Tables.

composition of the desired magnetic film and of the nitrides thereof were molded by the hot isostatic press method and were used as targets for sputtering. The magnetic films were evaluated for their magnetic characteristics and corrosion resistance by methods similar to those mentioned above. The results were as shown in Tables 9-1 and 9-2. Once again, the unit of saturation magnetization Bs is T, the unit of coercive force Hc is Oe, the magnetic permeability $\mu$ is a value at 1 MHz, the unit of magnetostriction constant $\lambda s$ is $10^{-6}$, and the unit of resistivity $\rho$ is $10^{-8}$ $\Omega$.m. Moreover, Bs(0)

TABLE 8

| | Bs | Hc | $\mu$ | $\lambda$ | $\rho$ | Bs(t)/Bs(O) |
|---|---|---|---|---|---|---|
| $(Co_{72}Ta_{14}N_{14})_{0.9}(Cr_{80}Ru_{20})_{0.1}$ | 1.18 | 0.4 | 2000 | 1 | 78 | 65 |
| $(Co_{72}Nb_{14}N_{14})_{0.9}(Cr_{80}Ru_{20})_{0.1}$ | 1.18 | 0.4 | 2500 | 1 | 88 | 65 |
| $(Co_{74}Hf_{12}N_{14})_{0.9}(Cr_{80}Ru_{20})_{0.1}$ | 1.23 | 0.2 | 2600 | 1 | 80 | 65 |
| $(Co_{72}Zr_{14}N_{14})_{0.9}(Cr_{80}Ru_{20})_{0.1}$ | 1.38 | 0.4 | 2800 | 1 | 83 | 65 |
| $(Co_{72}Ta_{14}N_{14})_{0.9}(Cr_{80}Rh_{20})_{0.1}$ | 1.18 | 0.4 | 2500 | 1 | 90 | 65 |
| $(Co_{72}Nb_{14}N_{14})_{0.9}(Cr_{80}Rh_{20})_{0.1}$ | 1.18 | 0.4 | 2000 | 1 | 93 | 65 |
| $(Co_{74}Hf_{12}N_{14})_{0.9}(Cr_{80}Rh_{20})_{0.1}$ | 1.22 | 0.4 | 2500 | 1 | 97 | 65 |
| $(Co_{72}Zr_{14}N_{14})_{0.9}(Cr_{80}Rh_{20})_{0.1}$ | 1.18 | 0.4 | 1800 | 1 | 91 | 65 |
| $(Co_{72}Ta_{14}N_{14})_{0.9}Al_{0.1}$ | 1.25 | 0.2 | 3300 | 1 | 98 | 85 |
| $(Co_{72}Nb_{14}N_{14})_{0.9}Al_{0.1}$ | 1.20 | 0.2 | 3200 | 1 | 99 | 75 |
| $(Co_{74}Hf_{12}N_{14})_{0.9}Al_{0.1}$ | 1.28 | 0.2 | 3200 | 1 | 99 | 85 |
| $(Co_{72}Zr_{14}N_{14})_{0.9}Al_{0.1}$ | 1.19 | 0.2 | 3100 | 1 | 95 | 80 |
| $(Co_{78}Ta_{11}N_{11})_{0.9}(Al_{60}Si_{40})_{0.1}$ | 1.35 | <0.1 | 3100 | 0.7 | 95 | 85 |
| $(Co_{78}Nb_{11}N_{11})_{0.9}(Al_{60}Si_{40})_{0.1}$ | 1.33 | <0.1 | 2900 | 0.9 | 90 | 85 |
| $(Co_{78}Hf_{11}N_{11})_{0.9}(Al_{60}Si_{40})_{0.1}$ | 1.40 | <0.1 | 2800 | 0.5 | 98 | 85 |
| $(Co_{76}Zr_{11}N_{11})_{0.9}(Al_{60}Si_{40})_{0.1}$ | 1.35 | <0.1 | 2500 | 0.9 | 90 | 85 |
| $(Co_{78}Ta_{11}N_{11})_{0.9}(Ti_{30}Cr_{70})_{0.1}$ | 1.25 | <0.1 | 3000 | 1 | 93 | 65 |
| $(Co_{78}Nb_{11}N_{11})_{0.9}(Ti_{30}Cr_{70})_{0.1}$ | 1.22 | <0.1 | 2800 | 1 | 90 | 65 |
| $(Co_{78}Hf_{11}N_{11})_{0.9}(Ti_{30}Cr_{70})_{0.1}$ | 1.23 | <0.1 | 3100 | 1 | 98 | 65 |
| $(Co_{78}Zr_{11}N_{11})_{0.9}(Ti_{30}Cr_{70})_{0.1}$ | 1.22 | <0.1 | 2800 | 1 | 90 | 65 |
| $(Co_{78}Ta_6Nb_5N_{11})_{0.9}(Cr_{80}Ru_{20})_{0.1}$ | 1.22 | <0.1 | 2000 | 1 | 90 | 70 |
| $(Co_{78}Ta_6Hf_5N_{11})_{0.9}(Cr_{80}Rh_{20})_{0.1}$ | 1.25 | <0.1 | 2100 | 1 | 92 | 70 |
| $(Co_{78}Ta_5Zr_5N_{11})_{0.9}Al_{0.1}$ | 1.20 | <0.1 | 2000 | 1 | 89 | 60 |
| $(Co_{78}Nb_6Hf_5N_{11})_{0.9}(Al_{60}Si_{40})_{0.1}$ | 1.25 | <0.1 | 2300 | 0.6 | 95 | 65 |
| $(Co_{78}Hf_5Zr_6N_{11})_{0.9}(Ti_{30}Cr_{70})_{0.1}$ | 1.22 | <0.1 | 2200 | 0.6 | 95 | 65 |

Similar characteristics were obtained by the Fe—C—N type or the Co—C—N type magnetic films which contains C as well as N. The magnetic films were formed by the sputtering method by using the $Ar/N_2$ mixture gas as a sputtering gas. Powders of the same elements as those of the represents a value of saturation magnetization of the magnetic film, and Bs(t) represents a value of saturation magnetization of the magnetic film after it was immersed in the 0.5N aqueous sodium chloride solution for 200 hours.

TABLE 9-1

| | Bs | Hc | $\mu$ | $\lambda$ | $\rho$ | Bs(t)/Bs(O) |
|---|---|---|---|---|---|---|
| $(Fe_{78}Ta_9C_8N_5)_{0.9}(Cr_{70}Ru_{30})_{0.1}$ | 1.45 | <0.1 | 2500 | 1 | 98 | 100 |
| $(Fe_{78}Nb_9C_8N_5)_{0.9}(Cr_{70}Ru_{30})_{0.1}$ | 1.45 | <0.1 | 2500 | 1 | 98 | 100 |
| $(Fe_{78}Hf_9V_8N_5)_{0.9}(Cr_{70}Ru_{30})_{0.1}$ | 1.49 | <0.1 | 3000 | 0.9 | 85 | 100 |
| $(Fe_{78}Zr_9C_8N_5)_{0.9}(Cr_{70}Ru_{30})_{0.1}$ | 1.45 | <0.1 | 3000 | 2 | 93 | 100 |
| $(Fe_{78}Ta_8C_8N_6)_{0.9}(Cr_{70}Rh_{30})_{0.1}$ | 1.40 | <0.1 | 2000 | 2 | 88 | 100 |
| $(Fe_{78}Nb_8C_8N_6)_{0.9}(Cr_{70}Rh_{30})_{0.09}$ | 1.42 | <0.1 | 2000 | 1 | 89 | 100 |
| $(Fe_{78}Hf_7C_8N_6)_{0.9}(Cr_{70}Rh_{30})_{0.1}$ | 1.52 | <0.1 | 3000 | 0.9 | 98 | 100 |
| $(Fe_{78}Zr_8C_8N_6)_{0.9}(Cr_{70}R_{30})_{0.1}$ | 1.43 | <0.1 | 2500 | 1 | 93 | 100 |
| $(Fe_{78}Ta_8C_8N_6)_{0.9}Al_{0.1}$ | 1.43 | <0.1 | 3500 | 0.8 | 98 | 100 |
| $(Fe_{78}Nb_8C_8N_6)_{0.9}Al_{0.1}$ | 1.40 | <0.1 | 3000 | 0.9 | 95 | 100 |
| $(Fe_{79}Hf_7C_8N_6)_{0.9}Al_{0.1}$ | 1.50 | <0.1 | 3000 | 1 | 95 | 100 |
| $(Fe_{78}Zr_9C_8N_5)_{0.9}Al_{0.1}$ | 1.40 | <0.1 | 2300 | 1 | 89 | 100 |
| $(Fe_{78}Ta_9C_8N_5)_{0.9}(Al_{65}Si_{35})_{0.1}$ | 1.51 | <0.1 | 3800 | 0.6 | 103 | 100 |
| $(Fe_{78}Nb_9C_8N_5)_{0.9}(Al_{65}Si_{35})_{0.1}$ | 1.43 | <0.1 | 2900 | 0.7 | 98 | 100 |
| $(Fe_{80}Hf_7C_8N_5)_{0.9}(Al_{65}Si_{35})_{0.1}$ | 1.50 | <0.1 | 3000 | 0.5 | 108 | 100 |
| $(Fe_{78}Zr_9C_8N_5)_{0.9}(Al_{65}Si_{35})_{0.1}$ | 1.40 | <0.1 | 3000 | 0.8 | 95 | 100 |
| $(Fe_{78}Ta_9C_8N_5)_{0.9}(Ti_{30}Cr_{70})_{0.1}$ | 1.35 | <0.1 | 2000 | 1 | 95 | 100 |
| $(Fe_{78}Nb_9C_8N_5)_{0.9}(Ti_{30}Cr_{70})_{0.1}$ | 1.36 | <0.1 | 2100 | 1 | 96 | 100 |
| $(Fe_{80}Hf_7C_8N_5)_{0.9}(Ti_{30}Cr_{70})_{0.1}$ | 1.45 | <0.1 | 2800 | 0.9 | 97 | 100 |
| $(Fe_{78}Zr_9C_8N_5)_{0.9}(Ti_{30}Cr_{70})_{0.1}$ | 1.40 | <0.1 | 3000 | 1 | 95 | 100 |
| $(Fe_{78}Ta_4Nb_5C_8N_5)_{0.9}(Cr_{80}Ru_{20})_{0.1}$ | 1.40 | <0.1 | 2300 | 1 | 95 | 100 |

TABLE 9-1-continued

| | Bs | Hc | $\mu$ | $\lambda$ | $\rho$ | Bs(t)/Bs(0) |
|---|---|---|---|---|---|---|
| $(Fe_{80}Ta_2Hf_5C_8N_5)_{0.9}(Cr_{80}Ru_{20})_{0.1}$ | 1.50 | <0.1 | 2800 | 0.8 | 95 | 100 |
| $(Fe_{78}Ta_5Zr_4C_8N_5)_{0.9}Al_{0.1}$ | 1.45 | <0.1 | 2800 | 1 | 98 | 100 |
| $(Fe_{80}Nb_2Hf_5C_8N_5)_{0.9}(Al_{70}Si_{30})_{0.1}$ | 1.51 | <0.1 | 3000 | 0.7 | 98 | 100 |
| $(Fe_{80}Hf_5Zr_2C_8N_5)_{0.9}(Ti_{30}Cr_{70})_{0.1}$ | 1.50 | <0.1 | 2300 | 2 | 93 | 100 |

TABLE 9-2

| | Bs | Hc | $\mu$ | $\lambda$ | $\rho$ | Bs(t)/Bs(0) |
|---|---|---|---|---|---|---|
| $(Co_{78}Ta_9C_8N_5)_{0.9}(Cr_{70}Ru_{30})_{0.1}$ | 1.35 | <0.1 | 2000 | 1 | 90 | 100 |
| $(Co_{78}Nb_9C_8N_5)_{0.9}(Cr_{70}Ru_{30})_{0.1}$ | 1.35 | <0.1 | 2000 | 1 | 90 | 100 |
| $(Co_{78}Hf_9C_8N_5)_{0.9}(Cr_{70}Ru_{30})_{0.1}$ | 1.39 | <0.1 | 2300 | 0.9 | 93 | 100 |
| $(Co_{78}Zr_9C_8N_5)_{0.9}(C_{70}Ru_{30})_{0.1}$ | 1.35 | <0.1 | 2100 | 1 | 83 | 100 |
| $(Co_{78}Ta_8C_8N_6)_{0.9}(Cr_{70}Rh_{30})_{0.1}$ | 1.30 | <0.1 | 2000 | 1 | 88 | 100 |
| $(Co_{78}Nb_8C_8N_6)_{0.91}(Cr_{70}Rh_{30})_{0.09}$ | 1.32 | <0.1 | 2000 | 1 | 83 | 100 |
| $(Co_{79}Hf_7C_8N_6)_{0.9}(Cr_{70}Rh_{30})_{0.1}$ | 1.40 | <0.1 | 2300 | 0.9 | 85 | 100 |
| $(CO_{78}Zr_8C_8N_6)_{0.9}(Cr_{70}Rh_{30})_{0.1}$ | 1.35 | <0.1 | 2000 | 1 | 80 | 100 |
| $(Co_{78}Ta_8C_8N_6)_{0.9}Al_{0.1}$ | 1.33 | <0.1 | 2100 | 1 | 98 | 100 |
| $(Co_{78}Nb_8C_8N_6)_{0.9}Al_{0.1}$ | 1.30 | <0.1 | 2000 | 1 | 99 | 100 |
| $(Co_{79}Hf_7C_8N_6)_{0.9}Al_{0.1}$ | 1.40 | <0.1 | 2400 | 1 | 103 | 100 |
| $(Co_{78}Zr_9C_8N_6)_{0.9}Al_{0.1}$ | 1.30 | <0.1 | 2000 | 2 | 97 | 100 |
| $(Co_{78}Ta_9C_8N_5)_{0.9}(Al_{65}Si_{35})_{0.1}$ | 1.41 | <0.1 | 2800 | 0.6 | 98 | 100 |
| $(Co_{78}Nb_9C_8N_5)_{0.9}(Al_{65}Si_{35})_{0.1}$ | 1.33 | <0.1 | 2600 | 0.8 | 93 | 100 |
| $(Co_{78}Hf_7C_8N_5)_{0.9}(Al_{65}Si_{35})_{0.1}$ | 1.40 | <0.1 | 3000 | 0.3 | 105 | 100 |
| $(Co_{78}Zr_9C_8N_5)_{0.9}(Al_{65}Si_{35})_{0.1}$ | 1.30 | <0.1 | 2700 | 0.8 | 97 | 100 |
| $(Co_{78}Ta_9C_8N_5)_{0.9}(Ti_{30}Cr_{70})_{0.1}$ | 1.25 | <0.1 | 2100 | 1 | 90 | 100 |
| $(Co_{78}Nb_9C_8H_5)_{0.9}(Ti_{30}Cr_{70})_{0.1}$ | 1.26 | <0.1 | 2300 | 1 | 88 | 100 |
| $(Co_{80}Hf_7C_8N_5)_{0.9}(Ti_{30}Cr_{70})_{0.1}$ | 1.35 | <0.1 | 2800 | 1 | 85 | 100 |
| $(Co_{78}Zr_9C_8N_5)_{0.9}(Ti_{30}Cr_{70})_{0.1}$ | 1.30 | <0.1 | 1900 | 1 | 88 | 100 |
| $(Co_{78}Ta_4Nb_5C_8N_5)_{0.9}(Cr_{80}Ru_{20})_{0.1}$ | 1.30 | <0.1 | 1900 | 1 | 90 | 100 |
| $(Co_{80}Ta_2Hf_5C_8N_5)_{0.9}(Cr_{80}Ru_{20})_{0.1}$ | 1.40 | <0.1 | 1800 | 1 | 88 | 100 |
| $(Co_{78}Ta_5Zr_4C_8N_5)_{0.9}Al_{0.1}$ | 1.35 | <0.1 | 1800 | 1 | 85 | 100 |
| $(Co_{80}Nb_2Hf_5C_8N_5)_{0.9}(Al_{70}Si_{30})_{0.1}$ | 1.41 | <0.1 | 2000 | 0.8 | 83 | 100 |
| $(Co_{80}Hf_5Zr_2C_8N_5)_{0.9}(Ti_{30}Cr_{70})_{0.1}$ | 1.40 | <0.1 | 1900 | 1 | 90 | 100 |

When the composition of the magnetic thin film represented by $Fe_{100-a-b-c}X_aY_b(C-N)_c$ or $Co_{100-a-b-c}X_aY_b(C-N)_c$ (where X is at least one element selected from the group of Nb, Ta, Hf and Zr, and Y is one or two elements selected from the group of Cr, Ru, Al, Si, Ti and Rh) lies outside the ranges of $5 \leq a \leq 20$, $0.5 \leq b \leq 15$, $1 \leq c \leq 20$, and $0.5 \leq a/c \leq 0.7$, it is no longer possible to simultaneously realize both the desired soft magnetic characteristics and the corrosion resistance as shown in Tables 10-1 and 10-2 below. The units of measurement are the same here as in the other Tables.

TABLE 10-1

| | Bs | Hc | $\mu$ | $\lambda$ | $\rho$ | Bs(t)/Bs(0) |
|---|---|---|---|---|---|---|
| $(Fe_{72}Ta_{14}C_8N_6)_{0.9}(Cr_{80}Ru_{20})_{0.1}$ | 1.28 | 0.3 | 3000 | 1 | 95 | 60 |
| $(Fe_{72}Nb_{14}C_8N_6)_{0.9}(Cr_{80}Ru_{20})_{0.1}$ | 1.28 | 0.3 | 2800 | 2 | 93 | 60 |
| $(Fe_{74}Hf_{12}C_8N_6)_{0.9}(Cr_{90}Ru_{20})_{0.1}$ | 1.33 | 0.25 | 2900 | 1 | 97 | 60 |
| $(Fe_{72}Zr_{14}C_8N_6)_{0.9}(Cr_{80}Ru_{20})_{0.1}$ | 1.28 | 0.3 | 2500 | 2 | 90 | 60 |
| $(Fe_{72}Ta_{14}C_8N_6)_{0.9}(Cr_{80}Rh_{20})_{0.1}$ | 1.28 | 0.3 | 3100 | 2 | 95 | 60 |
| $(Fe_{72}Nb_{14}C_8N_6)_{0.9}(Cr_{80}Rh_{20})_{0.1}$ | 1.28 | 0.3 | 3000 | 2.5 | 95 | 60 |
| $(Fe_{72}Hf_{12}C_8N_6)_{0.9}(Cr_{80}Rh_{20})_{0.1}$ | 1.32 | 0.25 | 3000 | 1 | 97 | 60 |
| $(Fe_{72}Zr_{14}C_8N_6)_{0.9}(Cr_{80}R_{20})_{0.1}$ | 1.28 | 0.3 | 2900 | 2 | 91 | 60 |
| $(Fe_{72}Ta_{14}C_8N_6)_{0.9}Al_{0.1}$ | 1.35 | 0.2 | 3000 | 1 | 99 | 80 |
| $(Fe_{72}Nb_{14}C_8N_6)_{0.9}Al_{0.1}$ | 1.30 | 0.2 | 3000 | 2 | 95 | 70 |
| $(Fe_{74}Hf_{12}C_8N_6)_{0.9}Al_{0.1}$ | 1.38 | 0.2 | 3500 | 1 | 98 | 80 |
| $(Fe_{72}Zr_{14}C_8N_6)_{0.9}Al_{0.1}$ | 1.29 | 0.2 | 3000 | 1 | 97 | 70 |
| $(Fe_{76}Ta_{11}C_7N_4)_{0.9}(Al_{60}Si_{40})_{0.1}$ | 1.45 | <0.1 | 3500 | 0.7 | 95 | 85 |
| $(Fe_{78}Nb_{11}C_7N_4)_{0.9}(Al_{60}Si_{40})_{0.1}$ | 1.43 | <0.1 | 3500 | 0.8 | 95 | 78 |
| $(Fe_{78}Hf_{11}C_7N_4)_{0.9}(Al_{60}Si_{40})_{0.1}$ | 1.50 | <0.1 | 3800 | 0.7 | 98 | 85 |
| $(Fe_{78}Zr_{11}C_7N_4)_{0.9}(Al_{60}Si_{40})_{0.1}$ | 1.45 | <0.1 | 3300 | 0.8 | 95 | 78 |
| $(Fe_{78}Ta_{11}C_7N_4)_{0.9}(Ti_{30}Cr_{70})_{0.1}$ | 1.35 | <0.1 | 3000 | 1 | 90 | 55 |
| $(Fe_{78}Nb_{11}C_7N_4)_{0.9}(Ti_{30}Cr_{70})_{0.1}$ | 1.32 | <0.1 | 3500 | 2 | 89 | 55 |

TABLE 10-1-continued

| | Bs | Hc | $\mu$ | $\lambda$ | $\rho$ | Bs(t)/Bs(0) |
|---|---|---|---|---|---|---|
| $(Fe_{78}Hf_{11}C_7N_4)_{0.9}(Ti_{30}Cr_{70})_{0.1}$ | 1.33 | <0.1 | 3000 | 1 | 92 | 55 |
| $(Fe_{78}Zr_{11}C_7N_4)_{0.9}(Ti_{30}Cr_{70})_{0.1}$ | 1.32 | <0.1 | 3200 | 2 | 92 | 55 |
| $(Fe_{78}Ta_6Nb_5C_7N_4)_{0.9}(Cr_{80}Ru_{20})_{0.1}$ | 1.32 | <0.1 | 2800 | 1 | 90 | 60 |
| $(Fe_{80}Ta_6Hf_5C_7N_4)_{0.9}(Cr_{80}Rh_{20})_{0.1}$ | 1.35 | <0.1 | 2700 | 2 | 89 | 60 |
| $(Fe_{78}Ta_6Zr_5C_7N_4)_{0.9}Al_{0.1}$ | 1.30 | <0.1 | 2600 | 2 | 92 | 55 |
| $(Fe_{78}Nb_6Hf_5C_7N_4)_{0.9}(Al_{60}Si_{40})_{0.1}$ | 1.35 | <0.1 | 2700 | 1 | 91 | 60 |
| $(Fe_{98}Hf_5Zr_6C_7N_4)_{0.9}(Ti_{30}Cr_{70})_{0.1}$ | 1.32 | <0.1 | 2800 | 1 | 90 | 60 |

TABLE 10-2

| | Bs | Hc | $\mu$ | $\lambda$ | $\rho$ | Bs(t)/Bs(0) |
|---|---|---|---|---|---|---|
| $(Co_{72}Ta_{14}C_8N_6)_{0.9}(Cr_{80}Ru_{20})_{0.1}$ | 1.18 | 0.4 | 2000 | 1 | 78 | 65 |
| $(Co_{72}Nb_{14}C_8N_6)_{0.9}(Cr_0Ru_{20})_{0.1}$ | 1.18 | 0.4 | 2500 | 1 | 88 | 65 |
| $(Co_{74}Hf_{12}C_8N_6)_{0.9}(Cr_{80}Ru_{20})_{0.1}$ | 1.23 | 0.2 | 2600 | 1 | 80 | 65 |
| $(Co_{72}Zr_{14}C_8N_6)_{0.9}(Cr_{80}Ru_{20})_{0.1}$ | 1.38 | 0.4 | 2800 | 1 | 83 | 65 |
| $(Co_{72}Ta_{14}C_8N_6)_{0.9}(Cr_{80}Ru_{20})_{0.1}$ | 1.18 | 0.4 | 2500 | 1 | 90 | 65 |
| $(Co_{72}Nb_{14}C_8N_6)_{0.9}(Cr_{80}Rh_{20})_{0.1}$ | 1.18 | 0.4 | 2000 | 1 | 93 | 65 |
| $(Co_{74}Hf_{12}C_8N_6)_{0.9}(Cr_{80}Rh_{20})_{0.1}$ | 1.22 | 0.4 | 2500 | 1 | 97 | 65 |
| $(Co_{72}Zr_{14}C_8N_6)_{0.9}(Cr_{80}Rh_{20})_{0.1}$ | 1.18 | 0.4 | 1800 | 1 | 91 | 65 |
| $(Co_{72}Ta_{14}C_8N_6)_{0.9}Al_{0.1}$ | 1.25 | 0.2 | 3300 | 1 | 98 | 85 |
| $(Co_{72}Nb_{14}C_8N_6)_{0.9}Al_{0.1}$ | 1.20 | 0.2 | 3200 | 1 | 96 | 75 |
| $(Co_{74}Hf_{12}C_8N_6)_{0.9}Al_{0.1}$ | 1.28 | 0.2 | 3200 | 1 | 99 | 85 |
| $(Co_{72}Zr_{14}C_8N_6)_{0.9}Al_{0.1}$ | 1.19 | 0.2 | 3100 | 1 | 95 | 80 |
| $(Co_{78}Ta_{11}C_7N_4)_{0.9}(Al_{60}Si_{40})_{0.1}$ | 1.35 | <0.1 | 3100 | 0.7 | 95 | 85 |
| $(Co_{78}Nb_{11}C_7N_4)_{0.9}(Al_{60}Si_{40})_{0.1}$ | 1.33 | <0.1 | 2900 | 0.9 | 90 | 85 |
| $(Co_{78}Hf_{11}C_7N_4)_{0.9}(Al_{60}Si_{40})_{0.1}$ | 1.40 | <0.1 | 2800 | 0.5 | 98 | 85 |
| $(Co_{78}Zr_{11}C_7N_4)_{0.9}(Al_{60}Si_{40})_{0.1}$ | 1.35 | <0.1 | 2500 | 0.9 | 90 | 85 |
| $(Co_{78}Ta_{11}C_7N_4)_{0.9}(Ti_{30}Cr_{70})_{0.1}$ | 1.25 | <0.1 | 3000 | 1 | 93 | 65 |
| $(Co_{78}Nb_{11}C_7N_4)_{0.9}(Ti_{30}Cr_{70})_{0.1}$ | 1.22 | <0.1 | 2800 | 1 | 90 | 65 |
| $(Co_{78}Hf_{11}C_7N_4)_{0.9}(Ti_{30}Cr_{70})_{0.1}$ | 1.23 | <0.1 | 3100 | 1 | 98 | 65 |
| $(Co_{78}Zr_{11}C_7N_4)_{0.9}(Ti_{30}Cr_{70})_{0.1}$ | 1.22 | <0.1 | 2800 | 1 | 90 | 65 |
| $(Co_{78}Ta_6Nb_5C_7N_4)_{0.9}(Cr_{80}Ru_{20})_{0.1}$ | 1.22 | <0.1 | 2000 | 1 | 90 | 70 |
| $(Co_{78}Ta_6Hf_5C_7N_4)_{0.9}(Cr_{80}Ru_{20})_{0.1}$ | 1.25 | <0.1 | 2100 | 1 | 92 | 70 |
| $(Co_{78}Ta_6Zr_5C_7N_4)_{0.9}Al_{0.1}$ | 1.20 | <0.1 | 2000 | 1 | 89 | 60 |
| $(Co_{78}Nb_6Hf_5C_7N_4)_{0.9}(Alhd\ 60Si_{40})_{0.1}$ | 1.25 | <0.1 | 2300 | 0.6 | 95 | 65 |
| $(Co_{98}Hf_5Zr_6C_7N_4)_{0.9}(Ti_{30}Cr_{70})_{0.1}$ | 1.22 | <0.1 | 2200 | 0.6 | 95 | 65 |

According to the present invention, an Fe-based or Co-based soft magnetic thin film of the type in which microcyrstals are precipitated is provided with desirable magnetic characteristics and improved corrosion resistance. This effect results from controlling the grain size of Fe or Co by forming a solid solution of elements in the layer of Fe or Co and from controlling the grain size of the carbide or the nitride by adjusting the ratio of Nb, Ta, Hf or Zr to C or N.

Figure 6:
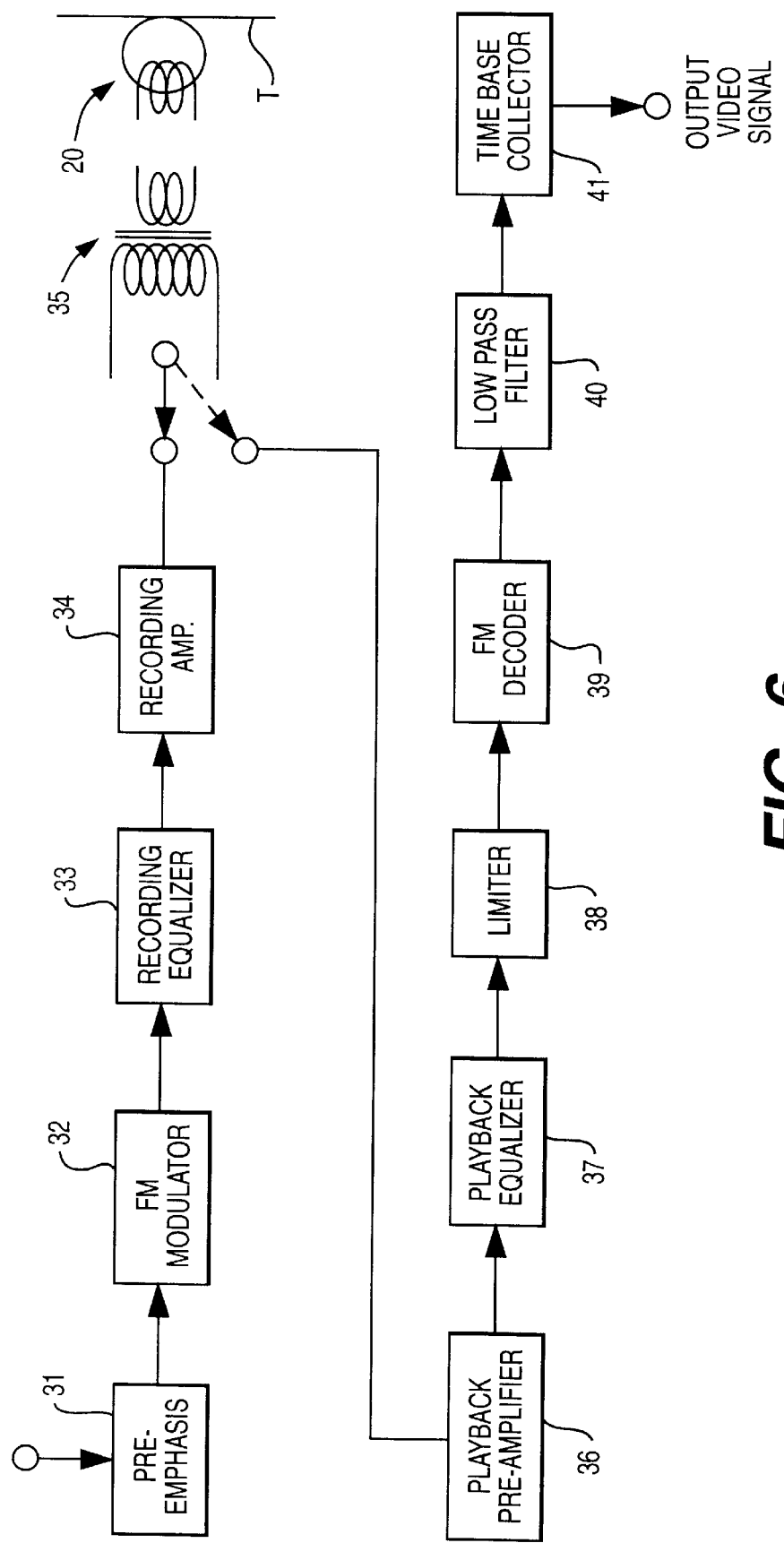
FIG. 6 illustrates an example of a video recording/playback unit having a magnetic head formed from the magnetic film of the present invention.

FIG. 6 shows a diagram of a VTR device that includes a magnetic head 20 that can have a core manufactured using the magnetic films of the present invention and a magnetic tape T, also preferably formed using the magnetic films of the present invention. The VTR device that is shown in FIG. 6 is merely one example of a magnetic recording unit to which the invention can be applied. In this regard, the magnetic head is preferably an inductive type magnetic head primarily used for a VTR, but other magnetic recording applications are also possible according to the present invention.

In the VTR example shown in FIG. 6, a video signal is input to a pre-emphasis circuit 31 that is connected to an FM modulator 32, which is in turn connected to a recording equalizer 33 and a recording amplifier 34. These elements constitute the recording circuit of the VTR. The playback circuit includes a playback pre-amplifier 36 that is connected to a playback equalizer 37, a limited 38, an FM decoder 39, a low pass filter 40 and a time base collector 41, which outputs the video signal. A rotational transformer 35 is used with magnetic head 20 in the recording and playback operations as is known in the conventional manner for a VTR device.

Figure 7:
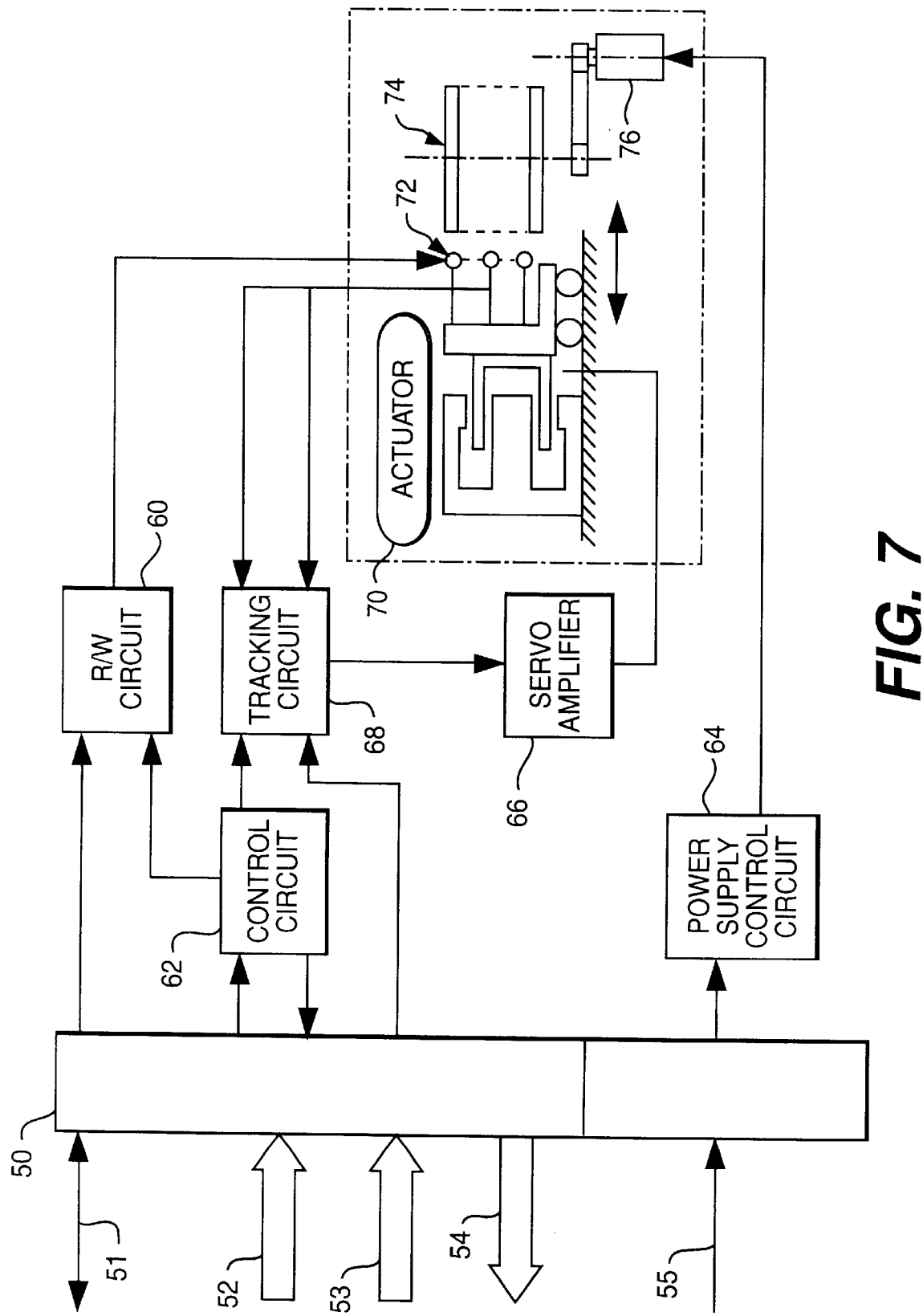
FIG. 7 illustrates an example of a recording apparatus having a recording medium which is a magnetic disk formed by using the magnetic thin film according to the present invention.

A magnetic disk apparatus is illustrated in FIG. 7. As shown in this figure, digital information signals 51 are transmitted to/from an interface 50 which connects to the magnetic disk apparatus. Additional signals including a control signal 52, an address signal 53, and an ON/OFF signal 55 are also input into interface 50. Status signal 54 is output from the interface.

The magnetic disk apparatus includes a magnetic disk 74, a magnetic head 72 for reading/writing information from/to the magnetic disk 74, an actuator for controlling movement of magnetic head 72, a spindle motor for spinning the magnetic disk 74, and a plurality of circuits. These circuits include a R/W circuit 60, a control circuit 62, a power supply control circuit 64, a servo amplifier 66, and a tracking circuit 68.

The magnetic head 72 is preferably formed using the magnetic films of the present invention which have been described above and is capable of recording image and/or voice data. By using the magnetic films according to the present invention the magnetic head can realize the benefits of having high corrosion resistance while still retaining important magnetic characteristics.

In summary, a soft magnetic thin film having desirable magnetic characteristics and improved corrosion resistance is provided according to the present invention by controlling the grain size of Fe, Co, and a carbide or nitride thereof. This is accomplished by controlling the grain size of Fe or Co by forming a solid solution of elements in the layer containing Fe or Co and also by controlling the grain size of the carbide or nitride by adjusting the ratio of Nb, Ta, Hf or Zr with respect to C or N.

While the present invention has been described above with respect to its preferred embodiments, one or ordinary skill in the art would be enabled by this disclosure to perform various modifications to these specific embodiments and still be within the scope and spirit of the present invention as recited in the appended claims.

We claim:

1. A soft magnetic thin film comprising a composition with a general formula of:

$$Fe_{100-a-b-c}X_aY_bZ_c,$$

wherein X is at least one element selected from a group consisting of Nb, Ta, Hf and Zr, Y is one or two elements selected from a second group consisting of Cr, Ru, Al, Si, Ti and Rh, and Z is at least one element selected from the group consisting of C and N, and wherein $5 \leq a \leq 20$, $0.5 \leq b \leq 15$, $1 \leq c \leq 20$, and $0.5 \leq a/c \leq 0.7$; and wherein a carbide or nitride of the element X has an average grain size of less than or equal to 3 nm.

2. The soft magnetic thin film according to claim 1, wherein Y is selected from a group consisting of Al—Si, Al, Cr—Ru, Cr—Rh and Ti—Cr.

3. The soft magnetic thin film according to claim 2, wherein $0.53 \leq a/c \leq 0.70$.

4. The soft magnetic thin film according to claim 1, wherein microcrystals are precipitated while heating the film either during or after the film is formed.

5. The soft magnetic thin film according to claim 1, wherein Fe has an average grain size that does not exceed 8.5 nm.

6. A soft magnetic thin film comprising a composition with a general formula of:

$$Co_{100-a-b-c}X_aY_bZ_c,$$

wherein X is at least one element selected from a group consisting of Nb, Ta, Hf and Zr, Y is one or two elements selected from a second group consisting of Cr, Ru, Al, Si, Ti and Rh, and Z is at least one element selected from the group consisting of C and N, and wherein $5 \leq a \leq 20$, $0.5 \leq b \leq 15$, $1 \leq c \leq 20$, and $0.5 \leq a/c \leq 0.7$; and wherein a carbide or nitride of the element X has an average grain size of less than or equal to 3 nm.

7. The soft magnetic thin film according to claim 6, wherein Y is selected from a group consisting of Al—Si, Al, Cr—Ru, Cr—Rh and Ti—Cr.

8. The soft magnetic thin film according to claim 7, wherein $0.53 \leq a/c \leq 0.70$.

9. The soft magnetic thin film according to claim 6, wherein microcrystals are precipitated while heating the film either during or after the film is formed.

10. A magnetic head having the magnetic film according to claim 9.

11. The soft magnetic thin film according to claim 6, wherein Co has an average grain size that does not exceed 8.5 nm.

* * * * *